(12) United States Patent
Rangarajan et al.

(10) Patent No.: US 12,217,525 B1
(45) Date of Patent: Feb. 4, 2025

(54) MULTI-MODAL ENSEMBLE DEEP LEARNING FOR START PAGE CLASSIFICATION OF DOCUMENT IMAGE FILE INCLUDING MULTIPLE DIFFERENT DOCUMENTS

(71) Applicant: FIRST AMERICAN FINANCIAL CORPORATION, Santa Ana, CA (US)

(72) Inventors: Arun Rangarajan, Irvine, CA (US); Dan Thompson, Tustin, CA (US); Madhu Kolli, Tustin, CA (US); Ritaprava Dutta, West Bengal (IN); Zheqi Tan, Madison, WI (US)

(73) Assignee: FIRST AMERICAN FINANCIAL CORPORATION, Santa Ana, CA (US)

( * ) Notice: Subject to any disclaimer, the term of this patent is extended or adjusted under 35 U.S.C. 154(b) by 0 days.

(21) Appl. No.: 18/608,746

(22) Filed: Mar. 18, 2024

Related U.S. Application Data

(63) Continuation-in-part of application No. 18/136,107, filed on Apr. 18, 2023, now Pat. No. 11,935,316.

(51) Int. Cl.
*G06V 30/413* (2022.01)
*G06V 10/80* (2022.01)
(Continued)

(52) U.S. Cl.
CPC .......... *G06V 30/416* (2022.01); *G06V 10/811* (2022.01); *G06V 10/82* (2022.01)

(58) Field of Classification Search
CPC .............................. G06V 30/413; G06V 10/82
See application file for complete search history.

(56) References Cited

U.S. PATENT DOCUMENTS 9,805,258 B2 * 10/2017 Neavin .................... H04N 1/00
10,402,641 B1 * 9/2019 Dang ..................... G06F 16/353
(Continued)

OTHER PUBLICATIONS

Das, Arpan, "Scanned Document Classification using Computer Vision: A deep learning approach to address the scanned document classification problem," Towards Data Science, Jan. 5, 2020, https://towardsdatascience.com/scanned-document-classification-using-computer-vision-33a42d9e01f9, 8 pages.
(Continued)

*Primary Examiner* — Fayyaz Alam
(74) *Attorney, Agent, or Firm* — Sheppard, Mullin, Richter & Hampton LLP

(57) ABSTRACT

Multimodal techniques are described for classifying start pages and/or document types of an unstructured document image package. To that end, some implementations of the disclosure relate to a method, including: obtaining a document image file including multiple pages and multiple document types; generating, for each page of the multiple pages, using multiple independent trained models, multiple independent predictions, each of the multiple independent predictions indicating: whether or not the page is a first page of a document, or a document type of the multiple document types that the page corresponds to; and generating, for each page of the multiple pages, based on the multiple independent predictions, using a neural network, a final prediction output indicating whether or not the page is the first page of a document, or one of the multiple document types that the page corresponds to.

18 Claims, 27 Drawing Sheets

(51) Int. Cl.
   *G06V 10/82*   (2022.01)
   *G06V 30/416*  (2022.01)

(56) References Cited

U.S. PATENT DOCUMENTS

| | | | |
|---|---|---|---|
| 2005/0134935 A1 | 6/2005 | Schmidtler et al. | |
| 2016/0055375 A1* | 2/2016 | Neavin | H04N 1/00 382/218 |
| 2018/0373711 A1 | 12/2018 | Ghatage et al. | |
| 2019/0114360 A1 | 4/2019 | Garg et al. | |
| 2020/0151591 A1 | 5/2020 | Li | |
| 2020/0394396 A1* | 12/2020 | Yanamandra | G06V 30/416 |
| 2021/0019512 A1* | 1/2021 | Uppal | G06V 10/454 |
| 2022/0229969 A1* | 7/2022 | Kukla | G06F 40/166 |
| 2022/0237398 A1* | 7/2022 | Asermely | G06F 3/0483 |

OTHER PUBLICATIONS

Gligan, Ioana, "Document Understanding: Document Splitting and Other Wonderful Stories", Ui Path Forum, Jun. 22, 2020, https://forum.uipath.com/t/document-understanding-document-splitting-and-other-wonderful-stories/232893, 24 pages.

Ogundare et al., "Identifying sub-documents in a composite scanned document using Naive Bayes, Levenshtein distance and domain driven knowledge base," 2018 5th International Conference on Soft Computing & Machine Intelligence (ISCMI). IEEE, 2018, 5 pages.

Vanderbeck et al., "A Machine Learning Approach to Identifying Sections in Legal Briefs." MAICS. 2011, 7 pages.

\* cited by examiner

| Page No. | Text - Documents | Text - Policy | Text - Separator | Text - Subdivision Map | Text - Subdivision Master | Vision - Documents | Vision - Policy | Vision - Separator | Vision Subdivision Map | Vision - Subdivision Master | Final Prediction |
|---|---|---|---|---|---|---|---|---|---|---|---|
| 1 | 0.9012 | 0.0000 | 0.0000 | 0.0988 | 0.0000 | 0.9791 | 0.0016 | 0.0036 | 0.0111 | 0.0047 | Subdivision Map |
| 2 | 0.9033 | 0.0000 | 0.0000 | 0.0967 | 0.0000 | 0.0000 | 0.0002 | 0.0008 | 0.9990 | 0.0000 | Subdivision Map |
| 3 | 0.0467 | 0.0032 | 0.0038 | 0.9438 | 0.0025 | 0.0000 | 0.9360 | 0.0028 | 0.0030 | 0.0582 | Policy |
| 4 | 0.7258 | 0.0001 | 0.0004 | 0.2736 | 0.0001 | 0.0056 | 0.9418 | 0.0033 | 0.0009 | 0.0483 | Policy |

FIG. 5E

```
<para l="1375" t="1555" r="4723" b="1944" alignment="left" li="144" spaceBefore="15" lsp="exactly" lspExact="228" language="en">
<ln l="1390" t="1555" r="4723" b="1721" baseLine="1707" bold="true" underlined="none" subsuperscript="none" fontSize="1000"
   fontPitch="variable" spacing="0" forcedEOF="true">
<wd                      >RECORDED</wd>
<space/>
<wd l="2585" t="1555" r="2844" b="1706">AT</wd>
<space/>
<wd l="2909" t="1555" r="3298" b="1706">THE</wd>
<space/>
<wd l="3377" t="1562" r="4334" b="1721">REQUEST</wd>
<space/>
<wd l="4406" t="1562" r="4723" b="1714">OF.</wd>
</ln>
```

FIG. 12 designated by this Lessor in writing, the rental stated above with respect to the term of this Lease, which is stated as a percentage of the gross coin receipts received by Lessee from its coin operated laundry equipment in the Laundry Rooms, payable at least every (6) months. Lessor shall have the right to request a field audit (an on-site audit of coin collections made at the Laundry Rooms), upon reasonable prior notice, not more than once during each calendar quarter-year during the term of this Lease, provided Lessor pays to Lessee the then prevailing charges of Lessee for such an audit.

5. UTILITIES. Lessee may connect its laundry equipment to and through the electric, water, heat, gas and sewer lines and systems in the buildings and use such utilities at no additional charges to Lessee. Lessor shall at all times and at its cost maintain all such utilities and undertake all repairs and working order. Lessor shall upon discovery that such are needed and replacements immediately upon discovery that such are needed and complete them as soon as reasonably possible.

6. EXCLUSIVE LAUNDRY EQUIPMENT. Lessor represents that at the time of commencement of the term of this Lease there will be no laundry equipment in the Laundry Rooms, that no other lease will be in force or in effect upon commencement of the term of this Lease in connection with the operation of any other metered or non-metered laundry equipment anywhere on the Premises for general use by tenants, and that Lessor will not, during the term of this Lease or renewal hereof, install or use or permit any other person, firm or corporation to install or use any laundry equipment anywhere on the Premises. During the term of this Lease, Lessor shall not offer or permit any of the tenants in any of the buildings to use any laundry equipment located on any premises which are within a one (1) mile radius of the Premises and in which Lessor or any of its beneficiaries has any legal or beneficial interest.

```
┌─────────────────────────────────────────────────────────────────┐
│ Obtaining a document image file including multiple pages and documents 2410 │
└─────────────────────────────────────────────────────────────────┘
                                │
                                ▼
┌─────────────────────────────────────────────────────────────────┐
│ Obtaining first multiple page images corresponding to the multiple pages 2420 │
└─────────────────────────────────────────────────────────────────┘
                                │
                                ▼
┌─────────────────────────────────────────────────────────────────┐
│ Adding a blank page image to the first multiple page images to obtain second multiple page images 2430 │
└─────────────────────────────────────────────────────────────────┘
                                │
                                ▼
┌─────────────────────────────────────────────────────────────────┐
│ Obtaining multiple multi-page images by combining every two consecutive page images of the second multiple page images into a multi-page image associated with a page of the multiple pages 2440 │
└─────────────────────────────────────────────────────────────────┘
                                │
                                ▼
┌─────────────────────────────────────────────────────────────────┐
│ Generating, for each page of the multiple pages, based at least on the multi-page image associated with the page, using a trained multi-page image classification model, a prediction output indicating whether or not the page is a first page of a document 2450 │
└─────────────────────────────────────────────────────────────────┘
                                │
                                ▼
┌─────────────────────────────────────────────────────────────────┐
│ Splitting, based on the prediction generated for each page, the document image file into the multiple documents 2460 │
└─────────────────────────────────────────────────────────────────┘
```

FIG. 24

MULTI-MODAL ENSEMBLE DEEP LEARNING FOR START PAGE CLASSIFICATION OF DOCUMENT IMAGE FILE INCLUDING MULTIPLE DIFFERENT DOCUMENTS

CROSS-REFERENCE TO RELATED APPLICATIONS

This application is a continuation-in-part of and claims priority to U.S. patent application Ser. No. 18/136,107 filed Apr. 18, 2023, issued as U.S. Pat. No. 11,935,316 on Mar. 19, 2024, and titled "MULTI-MODAL ENSEMBLE DEEP LEARNING FOR START PAGE CLASSIFICATION OF DOCUMENT IMAGE FILE INCLUDING MULTIPLE DIFFERENT DOCUMENTS," which is incorporated herein by reference in its entirety.

BACKGROUND

Document splitting generally refers to the task of separating a composite document into subdocuments. One current approach for document splitting relies on human engineered textual features to separate subdocuments from a large composite document. Another current approach for document splitting uses the content of section headers to separate a single document into its component sections. The aforementioned approaches rely on a human with expert/industry knowledge of the content of the documents being processed to select and preprocess features ahead of time, before passing them to a machine learning model for consumption.

SUMMARY

Some implementations of the disclosure describe systems and methods for utilizing multimodal techniques to classify each page in a dataset containing an unstructured document image package. The techniques described herein can be particularly suited for automatically classifying start pages and document types of an unstructured document image package. Based on the multi-modal classification techniques described herein, document splitting for an entire unstructured document image package can be performed.

In one embodiment, a non-transitory computer-readable medium has executable instructions stored thereon that, when executed by a processor, cause the processor to perform operations comprising: obtaining a document image file including multiple pages corresponding to multiple documents; generating, for each page of the multiple pages, using multiple independent trained models, multiple independent predictions, each of the multiple independent predictions indicating whether or not the page is a first page of one of the documents; generating, for each page of the multiple pages, based on the multiple independent predictions, using an additional trained model, a final prediction output indicating whether or not the page is the first page of one of the documents, wherein the multiple independent trained models comprise two or more models selected from the group consisting of: a first trained model configured to predict, for each page, based on first image features of a multi-page image associated with the page, whether or not the page is the first page of one of the documents; a second trained model configured to predict, for each page, based on second image features of the page, whether or not the page is the first page of one of the documents; a third trained model configured to predict, for each page, based on font feature changes between the page and an adjacent page, whether or not the page is the first page of one of the documents; a fourth trained model configured to predict, for each page, based on margin feature changes between the page and the adjacent page, whether or not the page is the first page of one of the documents; and a fifth trained model configured to predict, for each page, based on textual features obtained by performing optical character recognition on the page, whether or not the page is the first page of one of the documents.

In some implementations, the multiple independent trained models comprise the first trained model.

In some implementations, the operations further comprise obtaining multiple multi-page images by combining every two consecutive pages of the multiple pages, the multiple multi-page images including the multi-page image associated with each page.

In some implementations, obtaining the multiple multi-page images further comprises: forming one of the multi-page images by combining a blank page with one of the multiple pages.

In some implementations, combining every two consecutive pages of the multiple pages comprises concatenating every two consecutive pages of the multiple pages.

In some implementations, the operations further comprise generating the first trained model by: obtaining multiple page images associated with multiple document image files; obtaining multiple multi-page images by combining every two consecutive page images of the multiple page images; tagging the multiple multi-page images with multiple labels, each of the labels indicating whether a respective one of multi-page images corresponds to a first page; and training, based on the multiple multi-page images and the multiple labels, an image classification model as the first trained model.

In some implementations, generating the first trained model further comprises: adding a blank page image to the multiple page images; and obtaining the multiple multi-page images comprises combining the blank page image with one of the multiple page images to form one of the multi-page images.

In some implementations, the multiple independent trained models comprise the third trained model.

In some implementations, the multiple independent trained models comprise the fourth trained model.

In some implementations, the multiple documents are associated with a real property, the multiple documents comprising: a map, a search result, or a recorded document.

In some implementations, the operations further comprise: splitting, based on the final prediction output generated for each page, the document image file into the multiple documents.

In one embodiment, a non-transitory computer-readable medium has executable instructions stored thereon that, when executed by a processor, cause the processor to perform operations comprising: obtaining a document image file including multiple pages corresponding to multiple documents; obtaining, for each page of the multiple pages, using multiple dependent models of a neural network, multiple feature embeddings, each of the feature embeddings corresponding to at least features of the page that are indicative of whether or not the page is a first page of one of the documents; combining, for each page of the multiple pages, the feature embeddings into combined feature embeddings; and generating, for each page of the multiple pages, based on the combined feature embeddings, using a neural network, a prediction output indicating whether or not the page is the first page of one of the documents, wherein the multiple feature embeddings of each comprise two or more feature embeddings selected from the group consisting of: first image features of a multi-page image including a combination of the page and an adjacent page; second image features of the page; textual features of the page; font features of the page and the adjacent page; and margin features of the page and the adjacent page.

In some implementations, a first feature embedding of the multiple feature embeddings comprises an output of a last hidden layer of one of the multiple dependent models.

In some implementations, a first feature embedding of the multiple feature embeddings comprises the first image features.

In some implementations, the operations further comprise obtaining the first image features of each page by concatenating the page with the adjacent page to form the multi-page image.

In some implementations, a first feature embedding of the multiple feature embeddings comprises the font features of the page and the adjacent page.

In some implementations, a first feature embedding of the multiple feature embeddings comprises the margin features of the page and the adjacent page.

In one embodiment, a non-transitory computer-readable medium having executable instructions stored thereon that, when executed by a processor, cause the processor to perform operations comprising: obtaining a document image file including multiple pages corresponding to multiple documents; obtaining first multiple page images corresponding to the multiple pages; adding a blank page image to the first multiple page images to obtain second multiple page images; obtaining multiple multi-page images by combining every two consecutive page images of the second multiple page images into a multi-page image associated with a page of the multiple pages; and generating, for each page of the multiple pages, based at least on the multi-page image associated with the page, using a trained image classification model, a first prediction indicating whether or not the page is a first page of one of the documents.

In some implementations, the operations further comprise: splitting, based on the first prediction generated for each page, the document image file into the multiple documents.

In some implementations, the operations further comprise: generating, for each page of the multiple pages, using a second trained model, a second prediction indicating whether or not the page is the first page of one of the documents; and generating, for each page of the multiple pages, based at least on the first prediction and the second prediction, using a third trained model, a final prediction output indicating whether or not the page is the first page of one of the documents.

In one embodiment, a non-transitory computer-readable medium has executable instructions stored thereon that, when executed by a processor, cause the processor to perform operations comprising: obtaining a document image file including multiple pages and multiple document types; generating, for each page of the multiple pages, using multiple independent trained models, multiple independent predictions, each of the multiple independent predictions indicating: whether or not the page is a first page of a document, or a document type of the multiple document types that the page corresponds to; and generating, for each page of the multiple pages, based on the multiple independent predictions, using a neural network, a final prediction output indicating whether or not the page is the first page of a document, or one of the multiple document types that the page corresponds to.

In some implementations, the final prediction output for each page comprises: a first likelihood that the page is the first page of a document; and a second likelihood that the page is associated with the one of the multiple document types.

In some implementations, the multiple independent models comprise two or more models selected from the group consisting of: a first trained model configured to predict, for each page, based on font feature changes between adjacent pages, whether or not the page is the first page of a document; a second trained model configured to predict, for each page, based on margin feature changes between adjacent pages, whether or not the page is the first page of a document; a third trained model configured to predict, for each page, based on image features of each page, whether or not the page is the first page of a document; or a document type of the multiple document types that the page corresponds to; and a fourth trained model configured to predict, for each page, based on textual features obtained by performing optical character recognition on each page, whether or not the page is the first page of a document; or a document type of the multiple document types that the page corresponds to.

In some implementations, the multiple models comprise the third trained model; the multiple document types comprise a blank page type; and the third trained model is configured to, predict, for each page, based on image features of each page, whether or not the page corresponds to the blank page type.

In some implementations, the operations further comprise generating the third trained model by: obtaining multiple page images associated with multiple document image files; tagging the multiple page images with multiple labels, each of the labels indicating whether a respective one of the page images is the blank page type; and training, based on the multiple page images and the multiple labels, an image classification model as the third trained model.

In some implementations, the multiple models comprise the third trained model; and the third trained model is configured to predict, based on image features of each page: a first likelihood that the page is the first page of the document; and a second likelihood that the page is associated with the one of the multiple document types.

In some implementations, the operations further comprise generating the third trained model by: obtaining multiple page images associated with multiple document image files; tagging the multiple page images with a first plurality of labels and a second plurality of labels, each of the first plurality of labels indicating whether a respective one of the page images is a start page, and each of the second plurality of labels indicating a document type of the multiple document types that the page corresponds to; and training, based on the multiple page images, the first plurality of labels, and the second plurality of labels, an image classification model as the third trained model.

In some implementations, the multiple document types are associated with a real property, the multiple document types comprising: a map, a search result, or a recorded document.

In some implementations, the operations further comprise: splitting, based on each final prediction output identifying whether or not each page of the document image file is the first page of a document, the document image file into multiple document image files, each of the multiple document image files corresponding to a respective one of the multiple document types.

In one embodiment, a non-transitory computer-readable medium has executable instructions stored thereon that, when executed by a processor, cause the processor to perform operations comprising: obtaining a document image file including multiple pages and multiple document types; obtaining, for each page of the multiple pages, using multiple dependent models of a neural network, multiple feature embeddings, each of the feature embeddings corresponding to at least features of the page that are indicative of whether or not the page is a first page of a document, or a document type of the multiple document types that the page corresponds to; combining the feature embeddings; and generating, for each page of the multiple pages, based on the combined feature embeddings, using the neural network, a prediction output indicating whether or not the page is the first page of a document, or one of the multiple document types that the page corresponds to.

In some implementations, a first feature embedding of the multiple feature embeddings comprises an output of a last hidden layer of one of the multiple dependent models.

In some implementations, the first feature embedding comprises image features indicative of whether the page is a blank page.

In some implementations, the first feature embedding comprises image features indicative of a document type of the multiple document types that the page corresponds to.

In some implementations, the first feature embedding comprises textual features indicative of a document type of the multiple document types that the page corresponds to.

In some implementations, a first feature embedding of the multiple feature embeddings comprises font features of the page and an adjacent page.

In some implementations, a first feature embedding of the multiple feature embeddings comprises margin features of the page and an adjacent page.

In some implementations, each of the feature embeddings is a tensor corresponding to at least features of the page that are indicative of whether or not the page is the first page of a document, or the document type of the multiple document types that the page corresponds to; and combining the feature embeddings comprises combining the feature embeddings into a combined tensor.

In some implementations, the prediction output for each page comprises: a first likelihood that the page is the first page of a document; and a second likelihood that the page is associated with the one of the multiple document types.

In one embodiment, a method comprises: obtaining, at a computing device, a document image file including multiple pages and multiple document types; generating, at the computing device, for each page of the multiple pages, using multiple independent trained models, multiple independent predictions, each of the multiple independent predictions indicating: whether or not the page is a first page of a document, or a document type of the multiple document types that the page corresponds to; and generating, at the computing device, for each page of the multiple pages, based on the multiple independent predictions, using a neural network, a final prediction output indicating whether or not the page is the first page of a document, or one of the multiple document types that the page corresponds to.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more implementations, is described in detail with reference to the following figures. The figures are provided for purposes of illustration only and merely depict example implementations.

FIG. 5C illustrates a third page of an unstructured document image file that can be processed using the method of FIG. 2.

FIG. 5D illustrates a fourth page of an unstructured document image file that can be processed using the method of FIG. 2.

FIG. 5E shows a data structure including the prediction outputs generated for the four pages shown in FIGS. 5A-5D by application of two independent models-a text model and a vision model, and a final prediction output generated by ensembling the predictions of the two independent models.

FIG. 9 depicts an example OCR XML output for an image, the output including font labels and corresponding locations of text contained within the image.

FIG. 10 depicts an example font feature prediction that can be generated by an object detection model for a document image file.

FIG. 12 illustrates an example of margin properties for a document image, in accordance with some implementations of the disclosure.

FIG. 17C depicts another example of a "non-blank" image.

FIG. 24 is an operational flow diagram illustrating an example method of splitting a document image file containing multiple documents into multiple documents using a multi-page image classification model, in accordance with some implementations of the disclosure.

Figure 1:
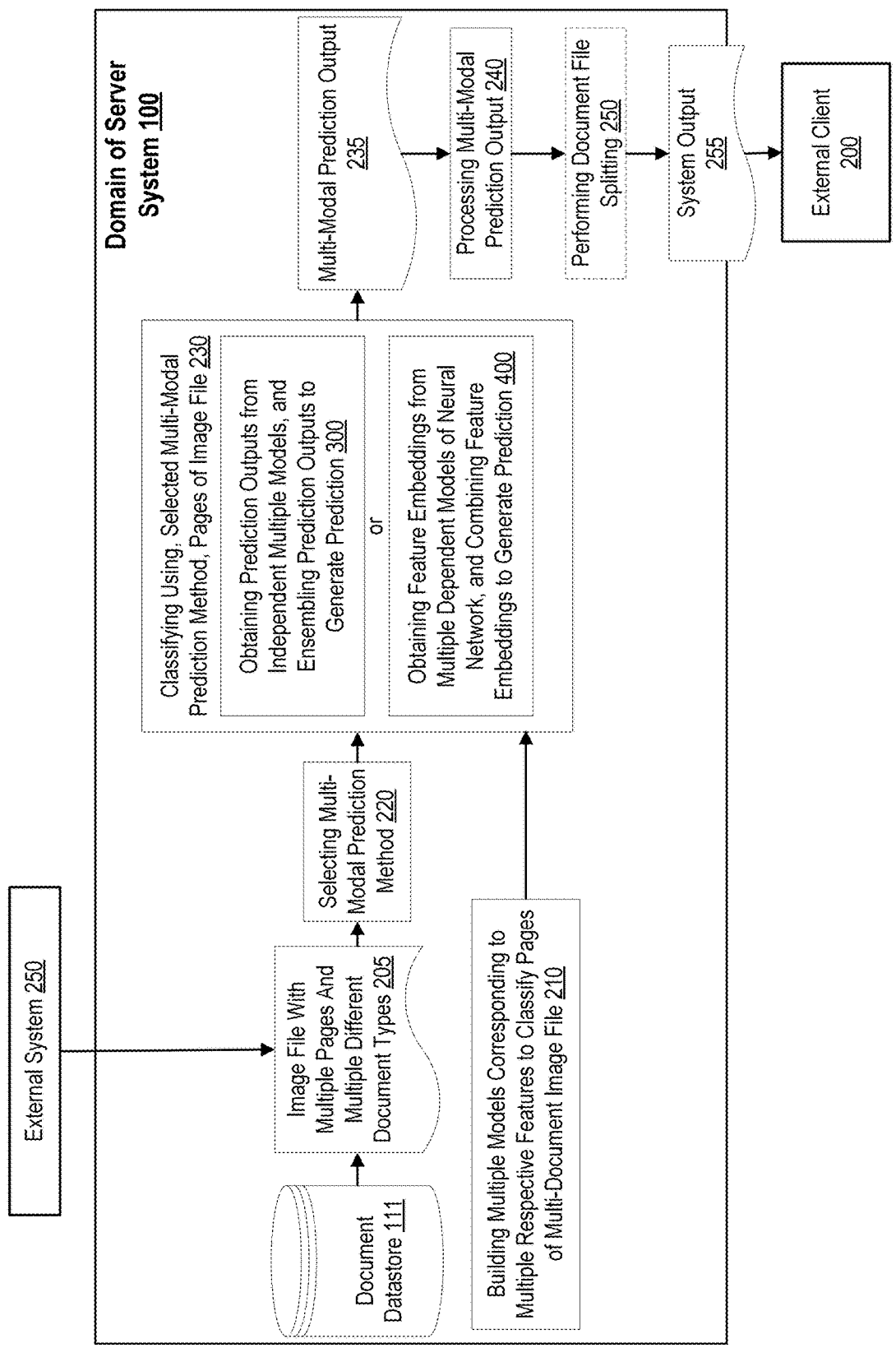
FIG. 1 depicts a flow diagram illustrating a method showing the general operation of a server system, in accordance with some implementations of the disclosure.

The figures are not exhaustive and do not limit the present disclosure to the precise form disclosed.

DETAILED DESCRIPTION

Systems and methods are described for utilizing a multimodal ensemble to classify each page in a dataset containing an unstructured document image package. The techniques described herein can be particularly suited for automatically classifying unstructured pages of a document image package as being a document start page or not, and/or being associated with a specific type of document.

As further described herein in accordance with some implementations, each of multiple independent models can be trained on specific document features that are used during multimodal prediction to differentiate pages (e.g., to recognize document start pages and/or document types). These features can include font, margins, textual content, and/or visual features. In this set of implementations, predictions output by each of the independent models can be combined and fed into a deep learning classifier that makes a prediction.

In another set of implementations, the feature embeddings of multiple dependent modalities can be combined to generate a prediction. These feature embeddings can also be indicative of font, margins, textual content, and/or visual features Various applications can be realized using the systems and methods described herein. In one application, using the multi-modal classification techniques described herein, document splitting for an entire unstructured document image package can be performed. In another application, a specific set of document images can be identified based on enterprise needs. For example, in the real estate industry, the techniques described herein can be used to identify plat maps, search results, and/or recorded documents from an unstructured document image package. The multi-modal classification techniques can also be suited for splitting document packages without training data in an unsupervised setting, using features such as font and margin properties.

The systems and methods described herein can simplify the process of deploying a multi-modal classifier and improve the computational performance and/or accuracy in an applications for identifying pages and/or splitting documents from unstructured document image packages. For example, by virtue of adapting a multi-modal framework that considers a number of features with the option of using a prediction merge or feature merge approach to generate a prediction, a workflow can be adapted to select one of the two approaches to optimize accuracy and efficiency during unstructured document classification and/or splitting. In addition, the techniques described herein leverage deep learning techniques to remove or reduce the need for human and manual construction of inputs or training data as is typical in the workflows in some industries. For example, in the title industry, document image packages can have variation by state and counties, as well as human input into how the packages are organized, making it expensive to manually determine the inputs or training data for models that assist with the workflow. Further still, by employing a page-based approach, the techniques described herein can be adapted to split a document of any length, and/or allow sections of the document rather than the entire document to be submitted for splitting. These and other advantages that may be realized by implementing the techniques described are further discussed below.

FIG. 1 depicts a flow diagram illustrating a method showing the general operation of a server system 100, in accordance with some implementations of the disclosure. Server system 100 is configured to obtain an image file 205 containing multiple pages corresponding to multiple different types of documents, and perform multi-modal deep learning to classify each page as i) being/not being a start/first page of a document; and/or ii) being associated with one of the multiple different types of documents.

The image file 205 can correspond to a dataset of an unstructured document image package. In title industry applications, the unstructured document image package can be, for example, a property title search package, a loan package, a title escrow checklist, a closing check list, or a funding package. These unstructured document image packages can have from 20 to 300 pages and contain several sub-documents within them. For example, a title search package of 75 pages can contain an examiner worksheet, order search results, county search, and multiple recorded documents such as deed of trusts, indentures, and warranty deeds. Although examples are described primarily in the context of the real estate or title insurance applications, it is contemplated that the technology described herein can be utilized in other applications that would benefit from identifying pages and/or splitting documents contained in unstructured document image packages.

Operation 210 includes building multiple models corresponding to multiple respective features to classify pages of multi-document image file 205. Each of the multiple models can be trained on specific document features that are used during multimodal prediction to differentiate pages of a document package. These features can include, for example, page fonts, page margins, page textual content, and/or page visual content. For example, in one particular embodiment, model sets can be built as defined by Table 1, below.

TABLE 1

| Model Set # | Model Input(s) | Model Prediction(s) | Model Type(s) |
| --- | --- | --- | --- |
| 1 | Image - Font Face and Family features | Is the current page a start page based on current and previous page font faces and families | Object Detection and/or Neural Network |
| 2 | Image - Margin left, top, right, bottom, width, and height features | Is the current page a start page based on current and previous page margin properties | Page Segmentation and/or Neural Network |
| 3 | Image - Maps/Search Results/Recorded Documents features | 4 binary classifications: Is it a start page? Is it a Map? Is it a search result? Is it a recorded document? | Residual Neural Network (ResNet) |
| 4 | Text - Maps/Search Results/Recorded Documents features | 4 binary classifications: Is it a start page? Is it a Map? Is it a search result? Is it a recorded document? | Language Model |
| 5 | Image - Blank Page | Binary Classification: Is it a valid page? Is it a blank page? | Residual Neural Network |

In the illustrated example of Table 1, five different sets of one or more models are configured to make predictions classifying document image pages based on different features. Each of the five sets of models can correspond to one or more models used to make a given prediction. Although Table 1 illustrates five different modality sets, it should be appreciated that some implementations may utilize a subset of the five modality sets (e.g., two, three, or four) in any combination. Additionally, although Table 1 illustrates each of the five modality sets being associated with one or more specific types of models (e.g., object detection, page segmentation, Resnet, language model) it should be appreciated that each of the modality sets can be implemented with other types of models. As further described below, by virtue of utilizing these multiple modalities to classify a document page as being a start page and/or associated with a specific type of document, their outputs can be combined to make a final prediction that can increase accuracy on multiple classification tasks. Particular techniques for building and applying such models are further described below.

After the models are built, they can be applied as part of an application or workflow that classifies pages of an unstructured document image file such as image file 205 (operations 220-240), and, optionally, performs splitting of the image file 205 (operation 250). This workflow can be performed in response to a processing request from an external client 200. For example, an application run by an external client 200 may initiate a request for an image file 205 stored at a document datastore 111 of server system 100. The external client 200 may need to access the document image file for title examination, mortgage review, or some other purpose. Alternatively, the workflow may be automatically performed by server system 100 in response to ingesting a new image file 205 from an external system 250.

Operation 220 includes selecting a multi-modal prediction method. Operation 230 includes classifying, using the selected multi-modal prediction method, pages of image file 205 to generate a multi-modal prediction output 235.

One of the following multi-modal prediction methods can be selected for classification of the pages of image file 205 and generation of a multi-modal prediction output 235: i) a method that ensembles prediction outputs from multiple independent models to generate a final prediction (method 300); or ii) a method that combines the feature embeddings obtained from multiple dependent models of a neural network to generate a final prediction (method 400). In alternative implementations, operation 220 may be omitted, and system 100 can be designed to always operate with one of the two multimodal prediction approaches described above, i.e., the "predictions merge" method 300 or the "features merge" method 400. For example, one system can be configured to operate with method 300, and another system can be configured to operate with method 400.

The multi-modal prediction output 235 can include, for each page of image file 205, one or more classifications of the page and a confidence score or likelihood associated with each of the classifications. For example, the prediction output 235 can including a first classification indicating whether or not a given page is a start/first page of a document, and/or a second classification indicating one or more types of document associated with the page (e.g., "search results", "subdivision map", "policy", "blank page", etc.). A confidence score (e.g., probability score between 0 and 1) can be associated with each of the classifications. In some cases, the output 235 can include confidence scores for classifications that the page was found to not correspond to. For example, the output that classifies a page as being a "policy" instead of a "subdivision map" may include a probability score of 0.99 or 99% associated with "policy" and a probability score of 0.01 or 1% associated with "subdivision map".

Operation 240 includes processing the multi-modal prediction output. For example, multi-modal predictions can be arranged on a per page/per image basis as a system output 255. The system can store metadata associating the following information with each page or image of image file 205: page number, one or more predictions that classify the page (e.g. classified as "first page" and "policy"), and a confidence score associated with each prediction (e.g., 90% confidence of "first page" and 95% confidence of "policy"). The metadata can be stored in a table, an array, or other suitable data structure.

Optional operation 250 includes performing document file splitting. Based on the multi-modal prediction output 235, the image file 205 can be split into multiple image files corresponding to the multiple constituent documents. Splitting can be performed by separating, based on pages classified as start pages, adjoining document images. For example, consider an image file having 6 pages where pages 1, 3, and 5, are classified as being start pages. In this example, the image file can be split into three files: a first file including pages 1-2, a second file including pages 3-4, and a third file including pages 5-6. Splitting can also, or alternatively, be performed based on the type of document that each page is classified as being associated with. In implementations where splitting is performed, the split document image files can be returned as system output 255 to external client 200. In such implementations, the system output 255 can also include the processed multi-modal prediction output described above.

Figure 2:
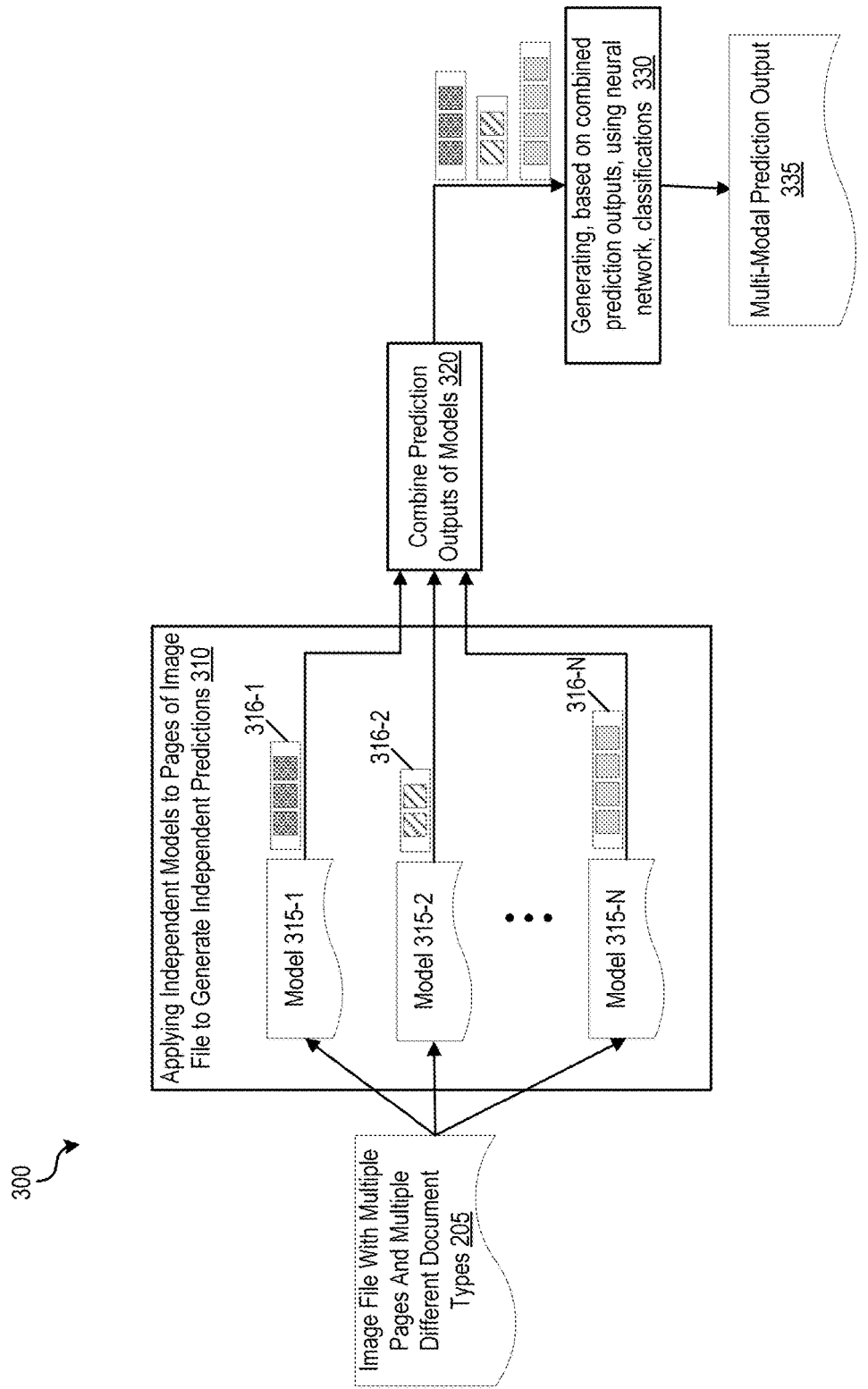
FIG. 2 is a flow diagram showing a method that ensembles prediction outputs from multiple independent models or sets of models to generate a final multi-modal prediction output classifying pages of an image file having multiple pages and multiple different document types, in accordance with some implementations of the disclosure.

FIG. 2 is a flow diagram showing a method 300 that ensembles prediction outputs from multiple independent models or sets of models to generate a final multi-modal prediction output 335 classifying pages of an image file 205 having multiple pages and multiple different document types, in accordance with some implementations of the disclosure. For illustrative purposes, FIG. 2 will be described with reference to FIG. 3, which is a flow diagram conceptually illustrating data outputs of one particular implementation of method 300.

Operation 310 includes applying each of the independent models or sets of models 315-1 to 315-N (collectively, "models 315") to the pages of the image file 205 to generate independent predictions 316-1 to 316-N (collectively, "predictions 316"). During operation, each of the models 315 can be used to classify the pages of image file 205 based on one or more features of the image file 205. For example, FIG. 3 conceptually illustrates an example where four different models are applied to an image file 205. The four models in this example include an object detection model, a page segmentation model, a CNN model, and a language model. The object detection model, the page segmentation model, and the CNN model in this example can be configured to make predictions based on image features. The language model can be configured to make a prediction based on textual features (e.g., obtained by perform optical character recognition on the pages of image file 205).

Figure 3:
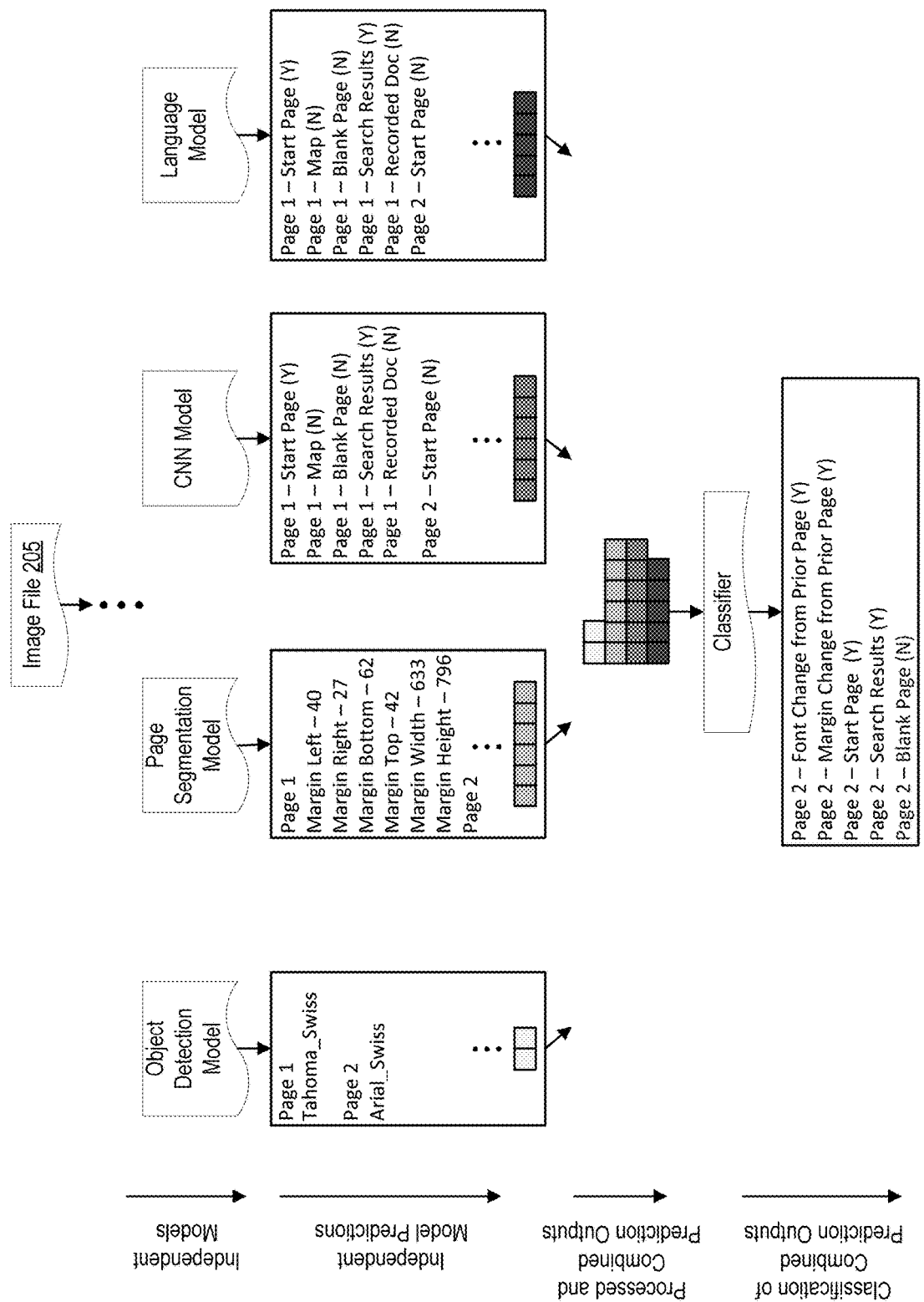
FIG. 3 conceptually illustrates an example application of the method of FIG. 2 to an image file.

As depicted by FIG. 3, the object detection model is used to generate a prediction classifying a font type of each page, the page segmentation model is used to generate a prediction classifying margins of each page, and each of the CNN model and language model are used to respectively generate predictions classifying a type of document each page is associated, and whether a given page is a start page. In the case of the object detection model that generates a prediction classifying a font type of each page, additional processing can be performed to compare font types properties of at least adjacent pages and a derive a prediction indicating whether a given page is a start page. Similarly, in the case of the page segmentation model that generates a prediction classifying margins of each page, additional processing can be performed to compare margin properties of at least adjacent pages and derive a prediction indicating whether a given page is a start page. In either case, the processing can involve forming pairwise inputs (e.g., from the font properties or margin properties of adjacent pages) and inputting the pairwise inputs into another model (e.g., a neural network) that takes into account the font change or margin change to generate a probability score indicating whether a given page is a start page.

Prior to classification by each of the models 315, the images of image file 205 can be preprocessed. Preprocessing can normalize the image so that the results of applying the models to different document images is more consistent. For example, each image can be rotated, denoised, and/or deblurred. In some implementations, the brightness and/or contrast of the image can be changed during pre-processing.

Operation 320 includes combining the prediction outputs 316. Prior to combining the prediction outputs, additional processing of the prediction outputs as described herein can be performed. For example, some or all of the prediction outputs can be processed to generate processed outputs indicating a probability that each page is a start page and/or a probability that a page belongs to a given document type. Operation 330 includes generating, based on the combined prediction outputs, using a neural network, a multi-modal prediction output 335 classifying each of the pages of the image file 205. For example, FIG. 3 depicts an example output classifying page 2.

Figure 4:
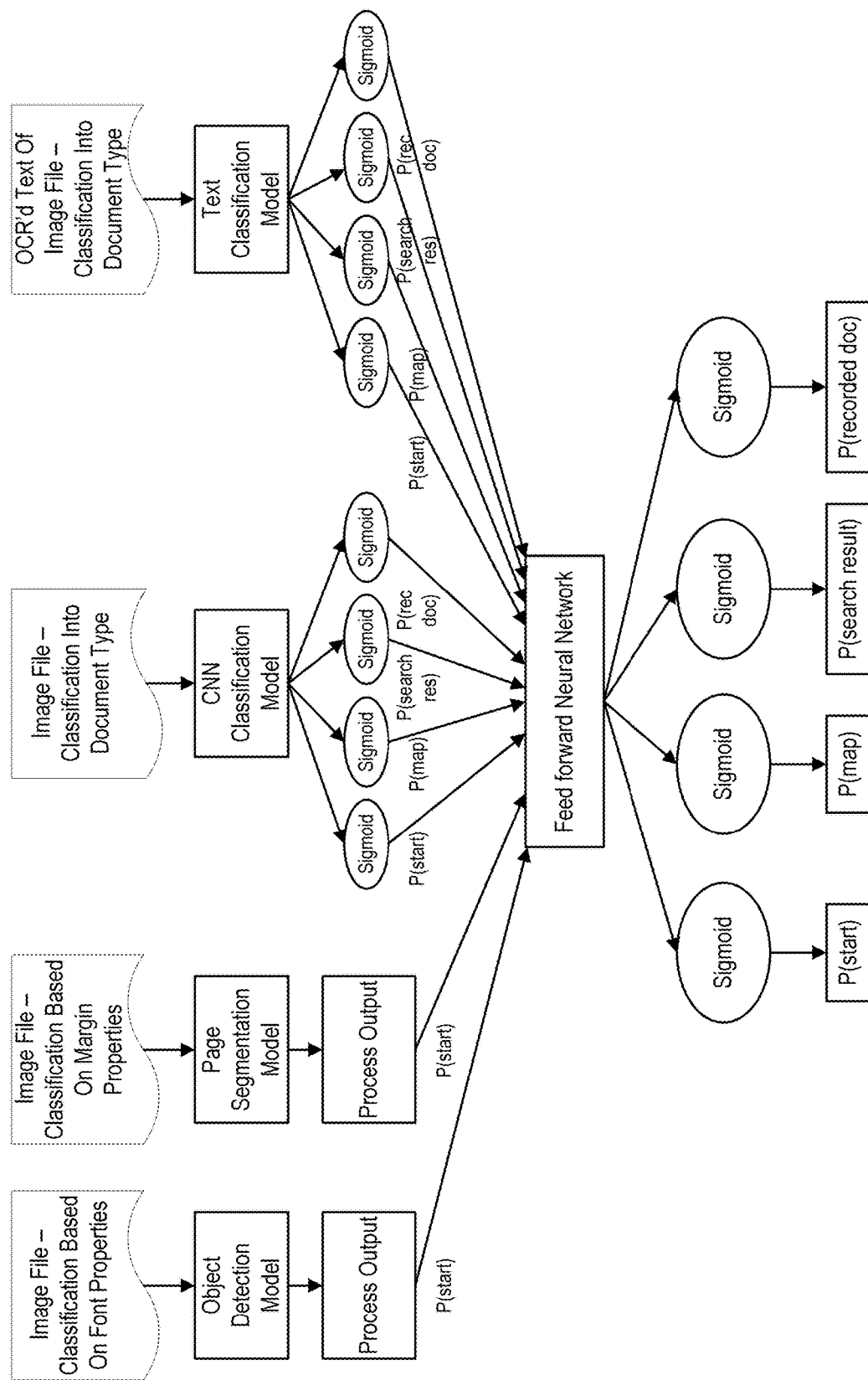
FIG. 4 illustrates an example of ensembling prediction outputs from multiple independent models to generate a multi-modal prediction including the following outputs: P (page is a start page of a new document, P (page is a map), P (page is a search result), and P (page is a recorded document), where P is a the probability (e.g., from 0 to 1) given by a sigmoid function.

In one implementation, the multi-modal prediction output 335 can be generated by combining the prediction outputs into a feed forward (FF) neural network used to make the final predictions. FIG. 4 illustrates one particular embodiment of generating a multi-modal prediction including the following outputs:

P (page is a start page of a new document)
P (page is a map)
P (page is a search result)
P (page is a recorded document)
where P is a the probability (e.g., from 0 to 1) given by a sigmoid function. As depicted in the example of FIG. 4, application of each of the independent models generates a respective prediction output. In the case of the CNN classification model and text classification model, the output includes a probability that a given page is start page and additional prediction outputs including probabilities that the document corresponds to one of three document types, i.e., "map", "search results", or "recorded document". In the case of the object detection model and page segmentation model, additional processing can be performed to generate an output including a probability that a given page is a start page. For example, in the case of the object detection model, which can output font features of each page, additional processing steps can include: for each pair of adjacent pages, creating a vector of font features, and using a trained neural network to predict, based on the vector, a likelihood that a given page is a start page. Similarly, in the case of page segmentation model, additional processing can be performed to generate an output including a probability that a given page is a start page, including: for each pair of adjacent pages, creating a vector of margin features, and using a trained neural network to predict, based on the vector, a likelihood that a given page is a start page.

In the example of FIG. 4, the prediction outputs generated using the independent models are combined using a feed forward neural network. The feed forward neural network is coupled to one or more sigmoid layers that apply one or more sigmoid functions used for classification. In this example, the neural network is trained as one entire entity such that the prediction based on the combined outputs of the independent model is part of the neural network. The outputs of the previous models are fed through a feed forward or dense layer. In this layer, the outputs can be run through an activation function, transforming them into different values. Those values are multiplied by weights learned during training. The results of the multiplication operations are added together and sent through the final sigmoid layer. The weights can be obtained during training of the entire neural network by performing backpropagation using gradient descent.

Figure 5B:
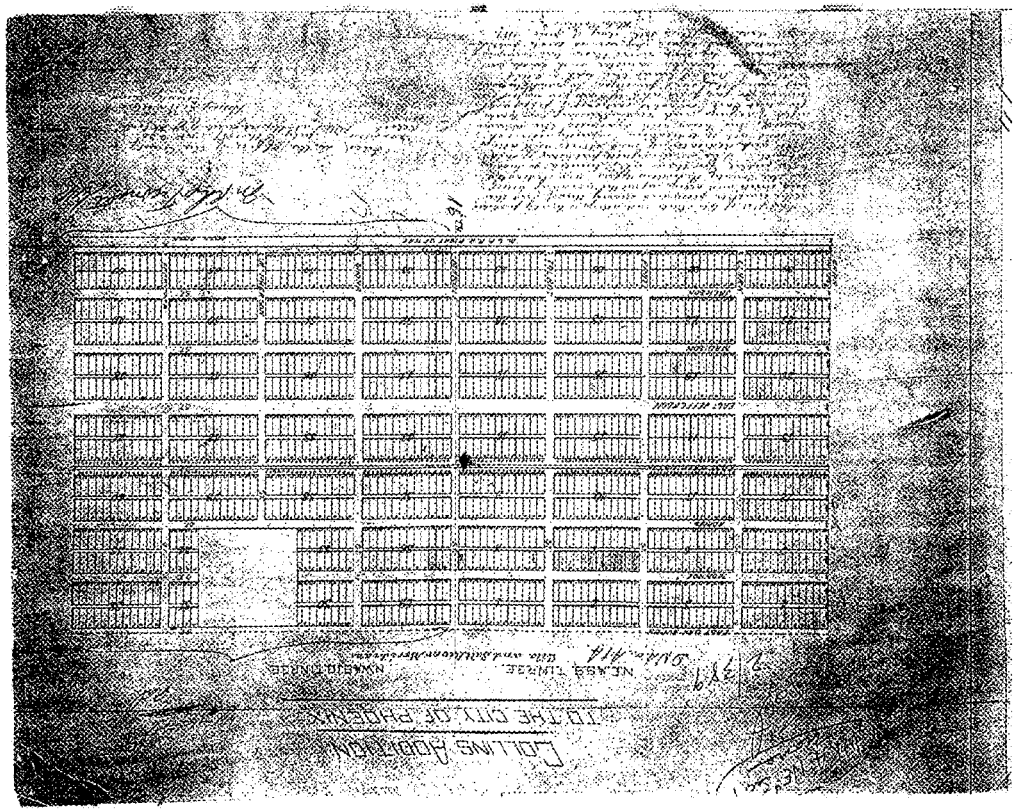
FIG. 5B illustrates a second page of an unstructured document image file that can be processed using the method of FIG. 2.
Figure 5A:
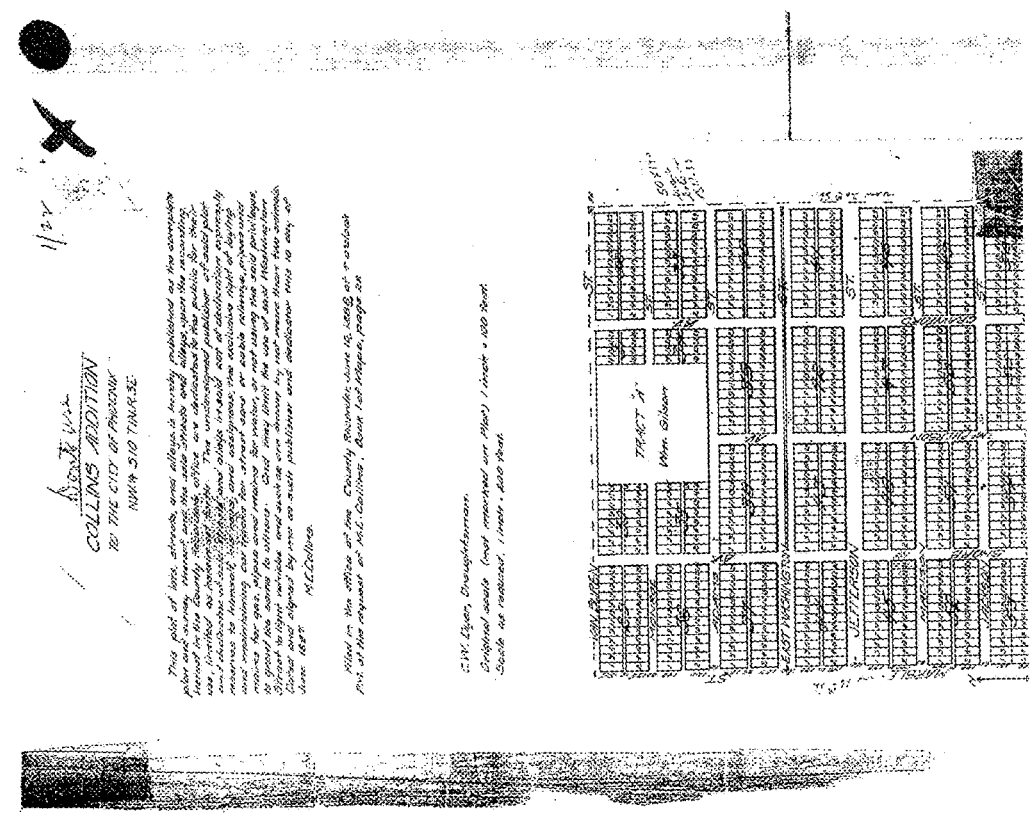
FIG. 5A illustrates a first page of an unstructured document image file that can be processed using the method of FIG. 2.
Figures 5C, 5D:
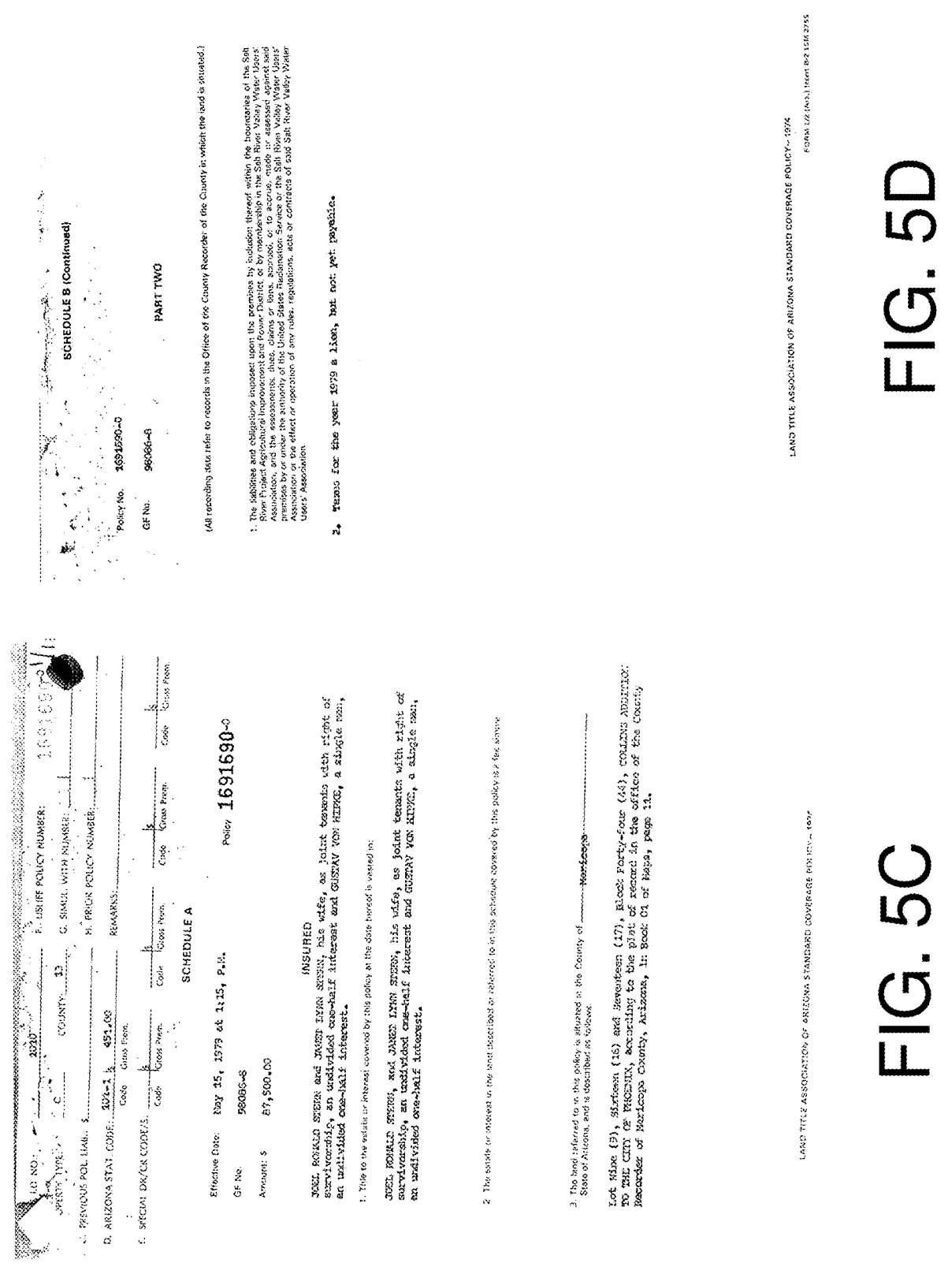

FIGS. 5A-5E show an additional example illustrating an example application of method 300 to an unstructured document image file containing 4 pages. The four pages include a "documents" page 1 (FIG. 5A), a "subdivision map" page 2 (FIG. 5B), a policy page 3 (FIG. 5C), and a policy page 4 (FIG. 5D). FIG. 5E shows a data structure including the prediction outputs generated for the four pages by two independent models-a text model as described herein and a vision model as described herein. As depicted, the prediction outputs are represented as probabilities or likelihoods from 0 to 1 that the document corresponds to a particular document type. The final column of the data structure of FIG. 5E shows the final prediction generated by combining the prediction outputs of the two independent models as described above.

The predictions merge method can have several advantages. Because each modality is trained separately, it can make it easier to retrain if any one modality is not performing well. When new data is acquired that is relevant only to one specific model (e.g., new text data applicable only to a text model), then just that specific model can be retrained. Additionally, because only one model is trained at a time, the training can be computationally faster. Furthermore, because the prediction merge approach is conceptually simpler than a features merge approach, it can be easier to develop and iterate upon, given its modularity and the ability replace individual models. This can be particularly suitable when available training data is limited.

Figure 6:
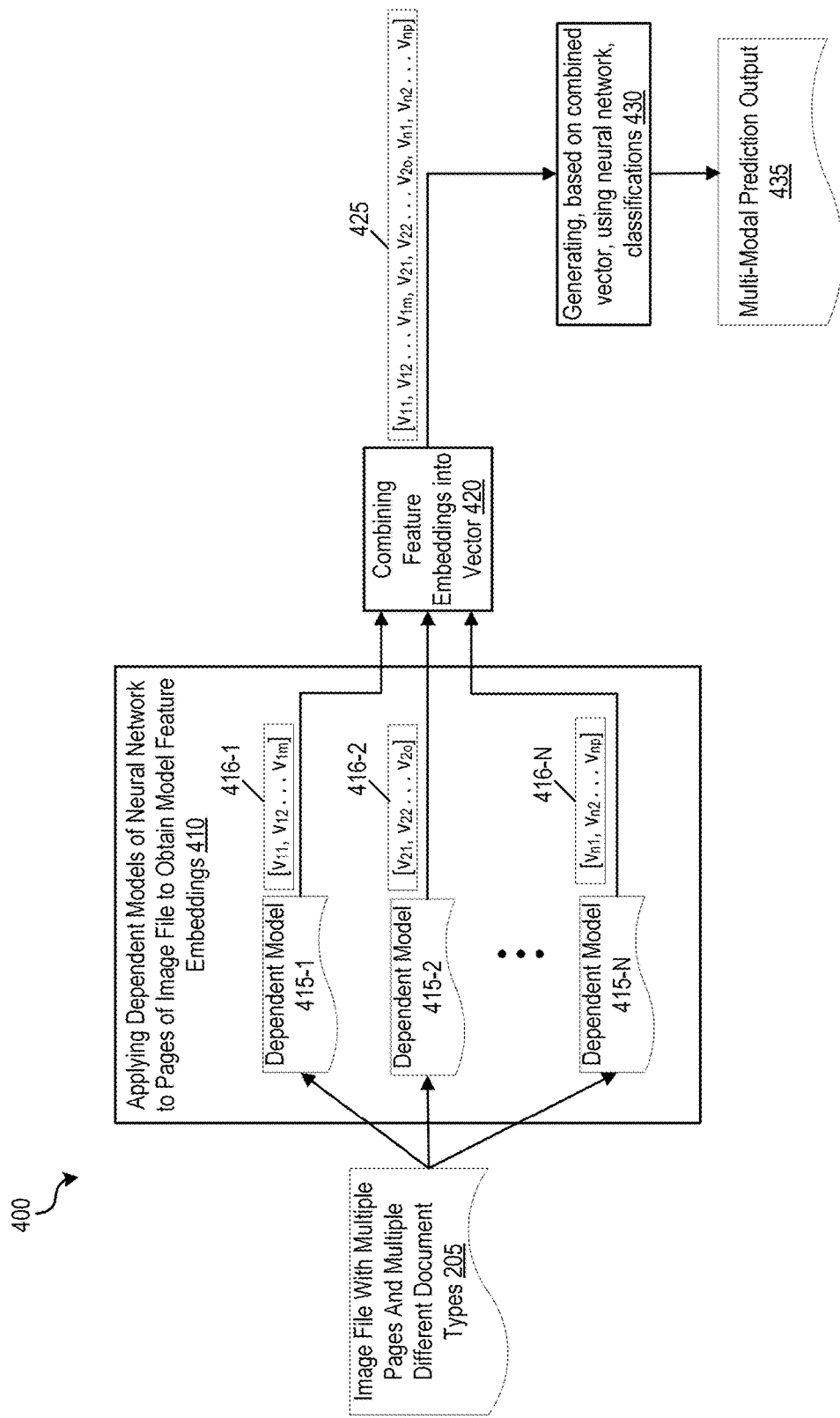
FIG. 6 is a flow diagram showing a method that combines feature embeddings from multiple dependent models of a neural network to generate a final multi-modal prediction output classifying pages of an image file having multiple pages and multiple different document types, in accordance with some implementations of the disclosure.

FIG. 6 is a flow diagram showing a method 400 that combines feature embeddings from multiple dependent models of a neural network to generate a final multi-modal prediction output 435 classifying pages of an image file 205 having multiple pages and multiple different document types, in accordance with some implementations of the disclosure. Prior to performing the depicted operations of method 400, the images of image file 205 can be preprocessed. Preprocessing can normalize the image so that the results of applying the models to different document images is more consistent. For example, each image can be rotated, denoised, and/or deblurred. In some implementations, the brightness and/or contrast of the image can be changed during pre-processing.

Operation 410 includes applying each of the dependent models 415-1 to 415-N (collectively, "models 415") of the neural network to the pages of the image file 205 to generate feature embeddings 416-1 to 416-n (collectively, "feature embeddings 416"). Each of the dependent models 415-1 to 415-N in this case are components/layers of a neural network model that is trained as an entire model. As depicted, each of the feature embeddings can take the form of a tensor such as a vector. In particular, each of the feature embeddings 416-1 to 416-n can be each of the tensors (e.g., vectors) output from the last hidden layer of each of the component/dependent models 415-1 to 415-n.

Operation 420 includes combining (e.g., concatenating) the features embeddings into a combined vector 425. As such, rather than having independent models directly predict an output (e.g., classification likelihoods), in this example the feature embeddings of multiple dependent models before the final prediction can be obtained and combined to produce a single, high-dimensional vector 425 of embeddings.

Figure 7:
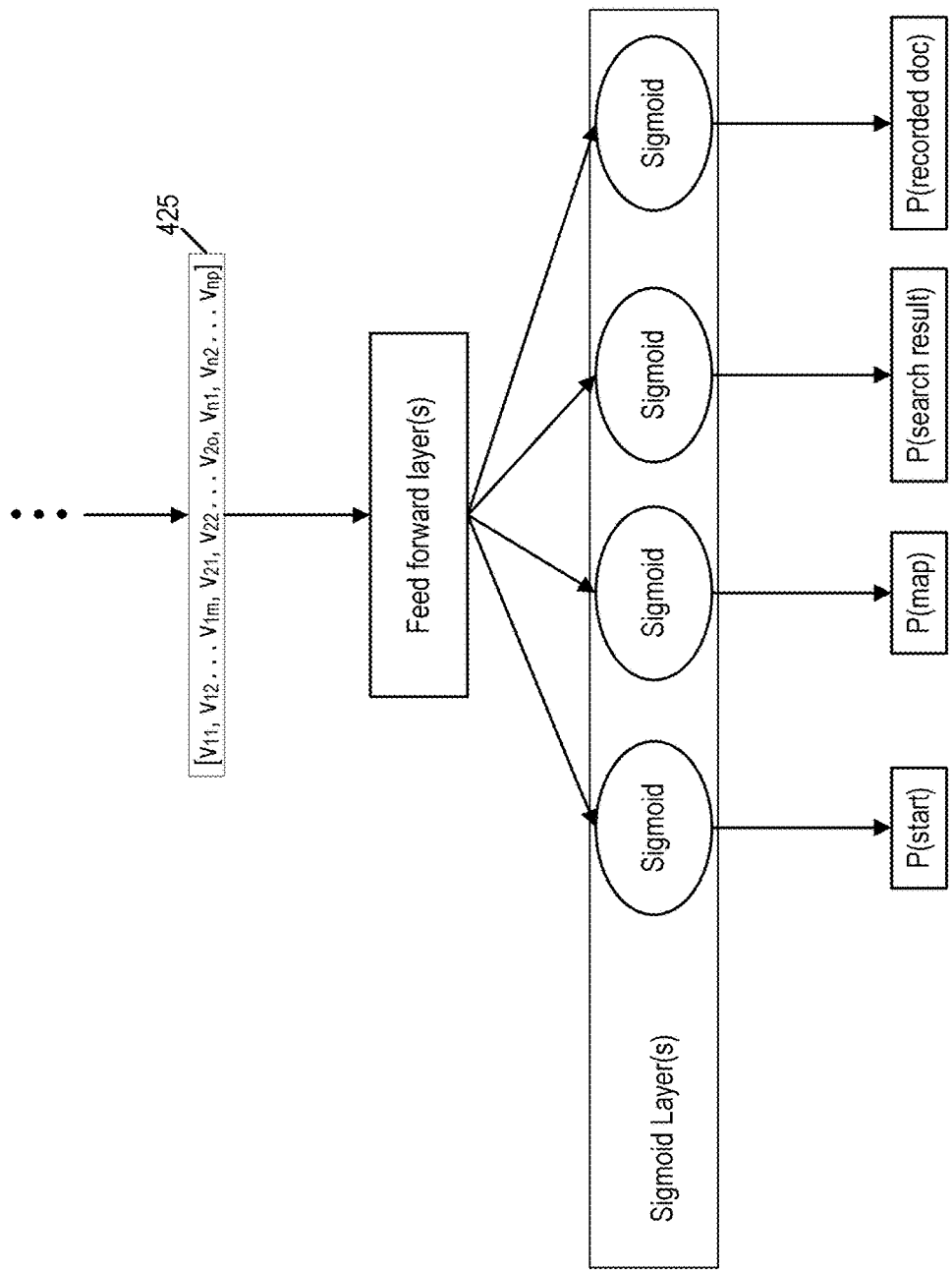
FIG. 7 illustrates an example of generating, using a neural network, based on a combination of feature embeddings obtained from multiple dependent models, a multi-modal prediction output classifying each of the pages of an image file.

Operation 430 includes generating, using the neural network, based on the combined vector 425, a multi-modal prediction output 435 classifying each of the pages of the image file 205. The multi-modal prediction output 435 can be generated by inputting/feeding the combined vector 425 into a FF layer of the neural network coupled to one or more sigmoid layers that apply one or more sigmoid functions used for classification. The FF layer enables nonlinear weight combinations of the vector components, while the sigmoid functions allow multiple predictions out of a single model. In implementations where more than one classification output is generated, more than one classification function—one for each output—can be utilized. In one particular embodiment, the following outputs can be generated:

P (page is a start page of a new document)
P (page is a map)
P (page is a search result)
P (page is a recorded document)
where P is a the probability (e.g., from 0 to 1) given by the sigmoid function. For instance, FIG. 7 illustrates one particular example of performing operation 430.

In some implementations, to train the combined neural network of the features merge approach described above, the network architecture can be designed such that each of the tensors or vectors that result from the second-to-last layer are concatenated together into one tensor or vector. A final feed forward layer can be configured to take the results and determine the appropriate weights to produce the best results. The weights can feed into individual sigmoid functions to obtain the aforementioned results. The model can be trained using neural network techniques such as backpropagation along with some form of stochastic gradient descent such as Adaptive Movement Estimation (ADAM) or ADAMW. As noted above, the entire model is trained as one individual model, in which the different sub models act as components/layers of the entire model. As such, the entire model is correspondingly optimized as one model during the training process.

The features merge can have several technical advantages. Because it combines all modalities into one model that is trained end to end, it can enable more complete optimization that simultaneously accounts for all models. Because the training process is configured to train all models simultaneously instead of independently, a better global optimum can be reached as models learn to compensate for the weakness of other models and/or otherwise specialize a specific aspect of classification. Another advantage of the features merge is that it can leverage richer and more granular data for the final prediction because it can work with the original feature vectors rather than the final outputs of independent models. As such, the features merge can work with hundreds of values from feature vectors combined together to make a final prediction. As such, the feature merge can produce a higher quality and more accurate answer.

Figure 8:
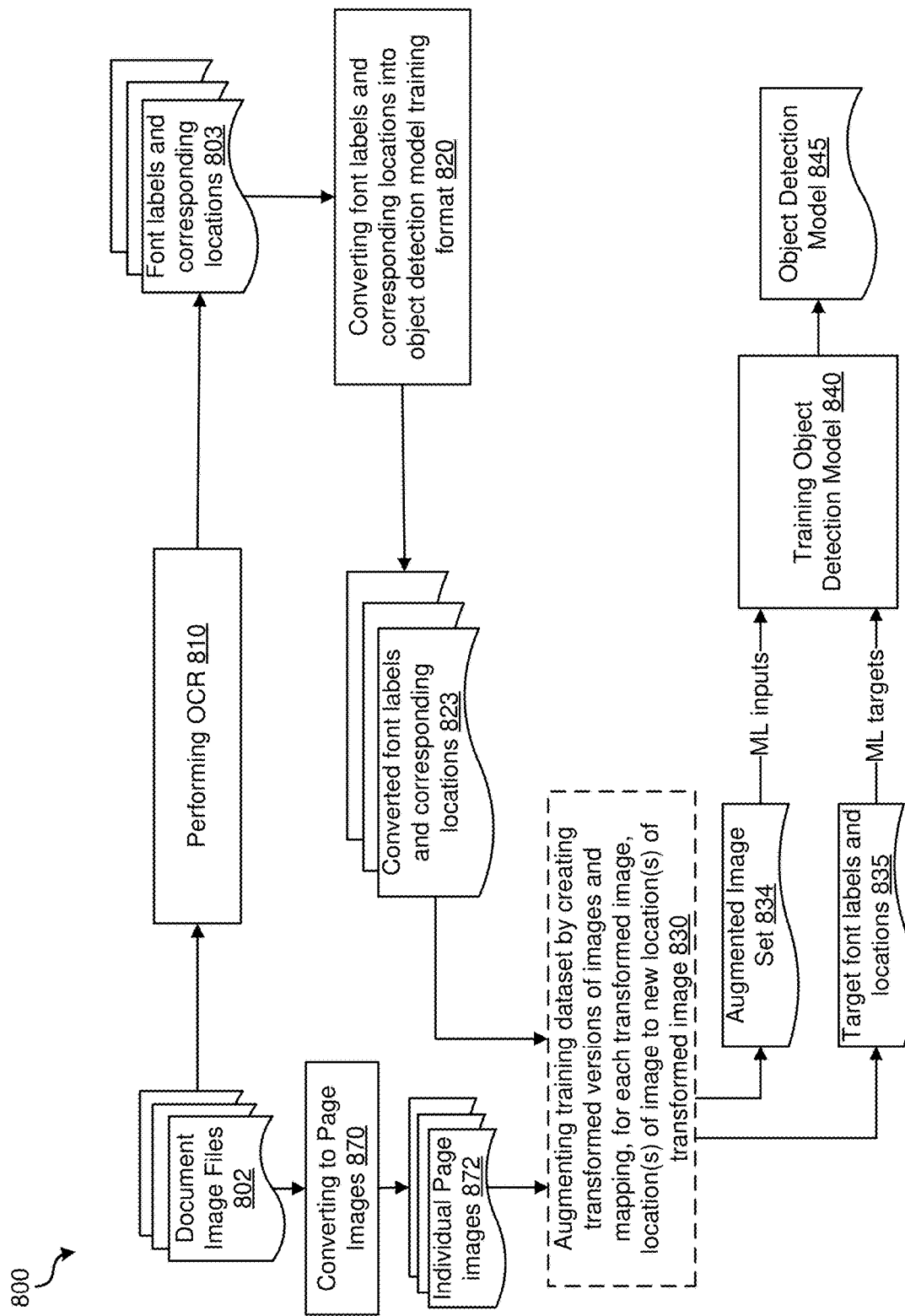
FIG. 8 is an operational flow diagram illustrating an example method of building an object detection model from a dataset of unlabeled document image files, to classify document images based on font properties, in accordance with some implementations of the disclosure.

As noted above, in some implementations, a model can be used to classify unstructured document images based on properties of fonts contained in the document images. In industry domains, particularly real estate, large unstructured document image packages can have multiple sub documents. Font features contained in such documents, including font faces and/or font family, can be different from one sub-document to another. As such, some implementations of the disclosure leverage this aspect of unstructured document image packages, i.e., differences in font features between the documents, to classify different pages. To this end, FIG. 8 is an operational flow diagram illustrating an example method 800 of building an object detection model 855 from a dataset of unlabeled document image files 802, to classify document images based on font properties, in accordance with some implementations of the disclosure.

The object detection model 855 can be a one-stage object detection algorithm that predicts bounding boxes over images. Examples of one-stage object detection algorithms that may be utilized include: any version of You only look once (YOLO), RetinaNet, Single Shot Detector (SSD), or the like. In alternative implementations, a two-stage object detection algorithm may be utilized. For example, a Region-based Convolutional Neural Network (R-CNN) may be utilized.

The document image files 805 can include hundreds, thousands, millions, or even billions of documents stored in a document image format (e.g., png, tiff, pdf, etc.). For example, in implementations where server system 100 is utilized by a title insurance company, these documents can comprise recorded documents, search results, maps, title policies, and various other documents relating to parcels of real property from different states and counties that are included in unstructured document image packages.

Operation 810 includes performing OCR on each of the document image files to obtain OCR'd files including font labels and corresponding locations 803 within each image. In some implementations, the OCR'd document files can be in an Extensible Markup Language (XML) or JavaScript Object Notation (JSON) format. The document image files 805 can be converted to the OCR'd files using any suitable OCR engine (e.g., any OCR engine capable of converting PDF/TIFF files to XML/JSON files).

The OCR engine can be used to provide each font label and its corresponding locations, which can be represented as a font face and family with a corresponding bounding box location (e.g., pixel coordinates within the document image). To illustrate, FIG. 9 depicts one example OCR XML output for an image. In the example, '<para' denotes the start of a paragraph, '<ln' the start of a line, and '<wd' the start of a word. Each line's font face and font family can be identified by OCR (highlighted), and all the words (i.e., "RECORDED", "AT", "THE", "REQUEST", "OF") in that line are of the same font face and font family. For illustration, the pixel coordinates of the bounding box (i.e., corresponding location) of the word "RECORDED" are also highlighted (with 'l' for left, 't' for top, 'r' for right and 'b' for bottom). As such, the identified fonts labels and their corresponding locations 803 can correspond to all words of the document identified via OCR.

Operation 820 includes converting the OCR'ed font labels and locations 803 into a format, i.e., converted font labels and corresponding locations 823, suitable for training an object detection model. For example, consider the case where the object detection model is in a YOLO format, which requires bounding boxes to be expressed as center_x, center_y, height, and width, scaled to the page width and height. In this case, the bounding box pixel coordinates of the word "RECORDED" in the prior example, i.e., l="1390" t="1555" r="2513" b="1706", are converted to the YOLO format. This can be done by calculating the center of the bound box as ((1+r)/2, (t +b)/2))=(1951.5, 1630.5), the bound box height as (b−t)=151, and the bounding box width as (r−l)=1123. Thereafter, these four parameters can be scaled to the height and width of the page, which can be obtained from the OCR output. For example, the height and width of the page, obtained from the OCR output of the prior example can be width="12240" height="15840". As such, the final converted values can be calculated as follows:

Center_x=1951.5/12240=0.1594
Center_y=1630.5/15840=0.1029
Height=151/15840=0.0095
Width=1123/12240=0.0917

As also noted in the prior example, the font family and font face of the word "RECORDED" are "Arial" and "Swiss". These can correspond to the class "Arial_Swiss", which can be matched to a class index (e.g., "5") of the object detection model. As such, for the word "RECORDED", the converted font labels and locations 823 can be expressed as: 5 0.1594 0.1029 0.0095 0.0917. This process can be repeated for each word on a page in the training dataset.

To enable optional image augmentation and subsequent training, operation 870 includes converting the pages of each of the document image files 802 to individual page images 872. For example, a PDF of multiple pages images may converted into multiple PNG files, each PNG file corresponding to a page.

Optional operation 830 includes augmenting the training dataset by creating transformed versions of individual images of the document image files and mapping, for each transformed version, the location(s) of any font classes identified in the image to new location(s) in the transformed image. As shown, the output of operation 830 includes an augmented image set 834 and target font labels and locations 835. The augmented image set 834 may include all original images and their transformed versions. The target font labels and 835 can include the locations and labels associated with the images of augmented image set 834.

When training an object detection model to recognize terms in poor quality images, it can be important to augment the number of images in the dataset to include images having a variety of potential deficiencies that could be encountered during application of the model. In this manner, the predictive capability of the model can be improved. To this end, image dataset augmentation may be based on variety of criteria, including, for example, poor quality, rotation, and/ or misalignments. In some implementations, an image can be transformed by applying one or more of the following transformations to the image: shifting the image (e.g., by rotating the image between 1-5 degrees from its center), adding noise to the image, blurring the image, changing the brightness of the image (e.g., randomly, setting to low brightness, or setting to high brightness), changing the hue of the image, or changing the saturation of the image. One or multiple transformed images may be generated for a given image. For example, in addition to having the original image, the training dataset may add a rotated version of the image, a blurred and noised version of the image, a version of the image with hue and saturation set to high levels, etc.

In some implementations, five transformed images, ten transformed images, or even more transformed images may be generated.

In at least some transformed images, it may be necessary to map the location (e.g., bounding box coordinates) of an original image to a new location (e.g., bounding box coordinates) of a transformed image. For example, for noise-based transformation, a suitable algorithm may be used to map to the new location. As another example, for rotated images, the mapping may be determined by calculating the distance of the original, non-augmented image's bounding box from the center and using a rotation matrix calculation (e.g., by applying the rotation matrix to the original coordinates). The new bounding box height and width may then be adjusted by a factor based on the original image's height and width. In some implementations, this calculation is applied to images rotated between about 1 and 5 degrees. In some transformed images, it may not be necessary to map the location (e.g., it does not change).

In addition to image augmentation, training of the model can be improved by using documents collectively having a sufficient number of unique font classes. For example, the number of unique font classes that can be utilized for training can be 10 or greater, 20 or greater, 30 or greater, etc.

Operation 840 includes training an object detection model 845 based on a training dataset including an input dataset and a target dataset. The input training dataset can include at least some of the individual page images of augmented image set 834, and the target training dataset can include at least some of the target font labels and locations 835. In implementations where operation 830 is skipped, the converted font labels and corresponding locations 823 can be used as the targets for training. During training, the input and target datasets can be split between training data and validation/testing data as needed, where each of the training data and validation data respectively contains corresponding label files and images. The training process can run for as many epochs as needed until metrics on the validation data reach acceptable levels.

In this case, the object detection model is trained to extract features from an input page image, and output target predictions of the locations and font labels of words in the image. The object detection model 845 may also output a confidence score associated with each prediction. To conceptually illustrate an example, FIG. 10 shows a prediction 1010 that can be generated by object detection model 845 for a document image file 1000 containing the word "RECORDED". In this example, the word "RECORDED" is predicted to correspond to font class Arial_Swiss with a probability of 0.95. In addition, the prediction can include the bounding box coordinates of the word "RECORDED" (with which the bounding box is drawn in the example). In some implementations, the predictions include the locations, font labels, and associated confidence scores of all words in an image.

In another implementation, a model can be trained to detect font changes between pages (and hence start pages) via a pairwise similarity scoring approach. In this implementation, for each text region in each page, its font features can be compared with the font features of all other text regions across multiple pages. To make this comparison, each set of font features can be represented as a vector. For each pair of text regions, a distance metric such as a Euclidean distance can be calculated between font feature vectors, where the distance metric represents the dissimilarity between the two compared text regions. The pairwise comparison results can be used to train a neural network that learns to identify patterns in the font feature vectors and classify each pair of text regions as being from the same or different starting pages. Thereafter, the trained neural network can be used to compare font features of each text region in a new page with the font features of all text regions across multiple pages. The neural network output for each pairwise comparison can be calculated, the output representing the probability that two text regions are from the same starting page.

Figure 11:
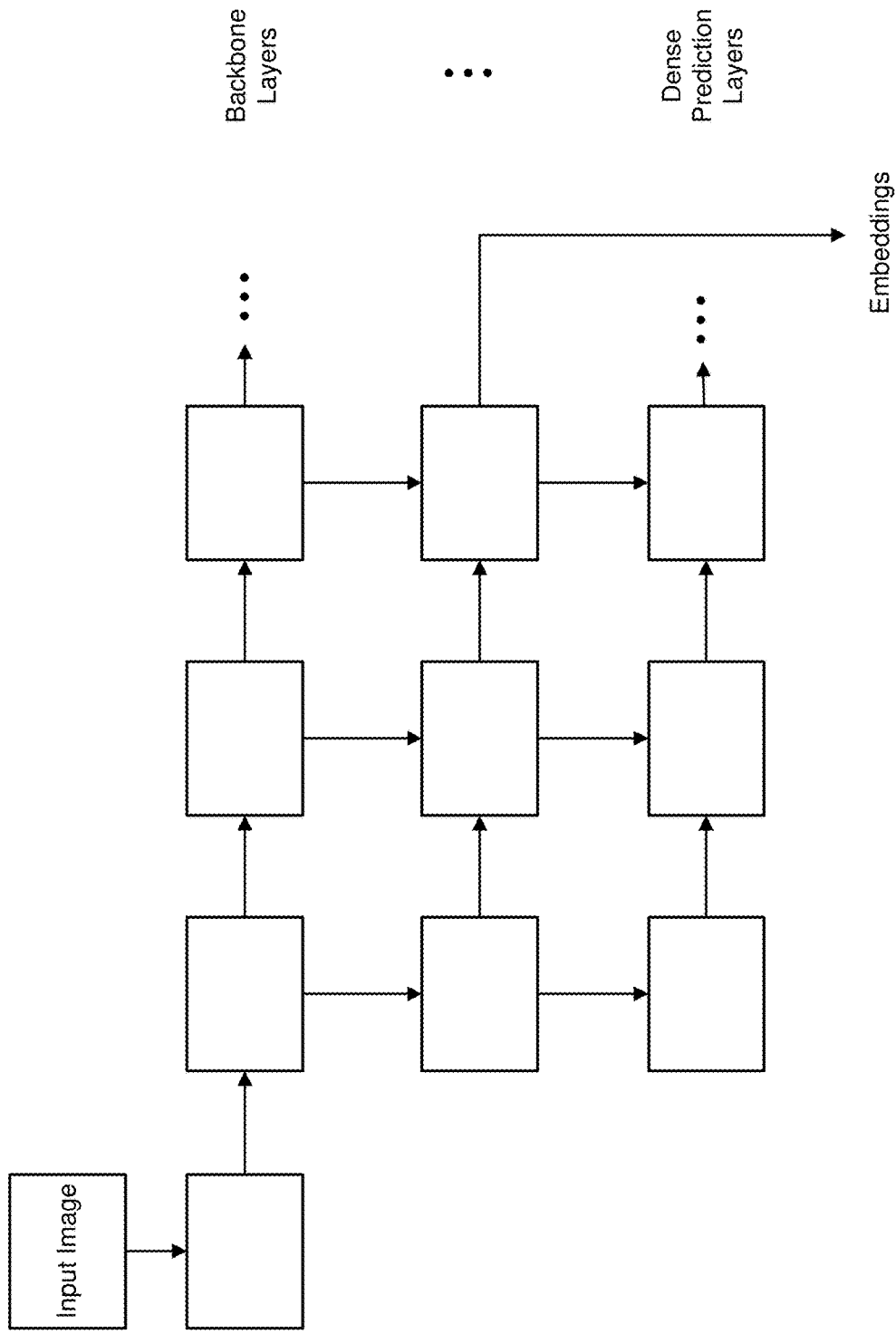
FIG. 11 conceptually illustrates the embeddings before a dense prediction layer of an objection detection model that can be used with the method of FIG. 6.

In implementations where font feature comparison is adapted for use with the predictions merge approach, instead of using the predictions of an independent model, the embeddings before the dense prediction layer of the object detection model can be used. This approach is depicted by FIG. 11.

Figure 12:
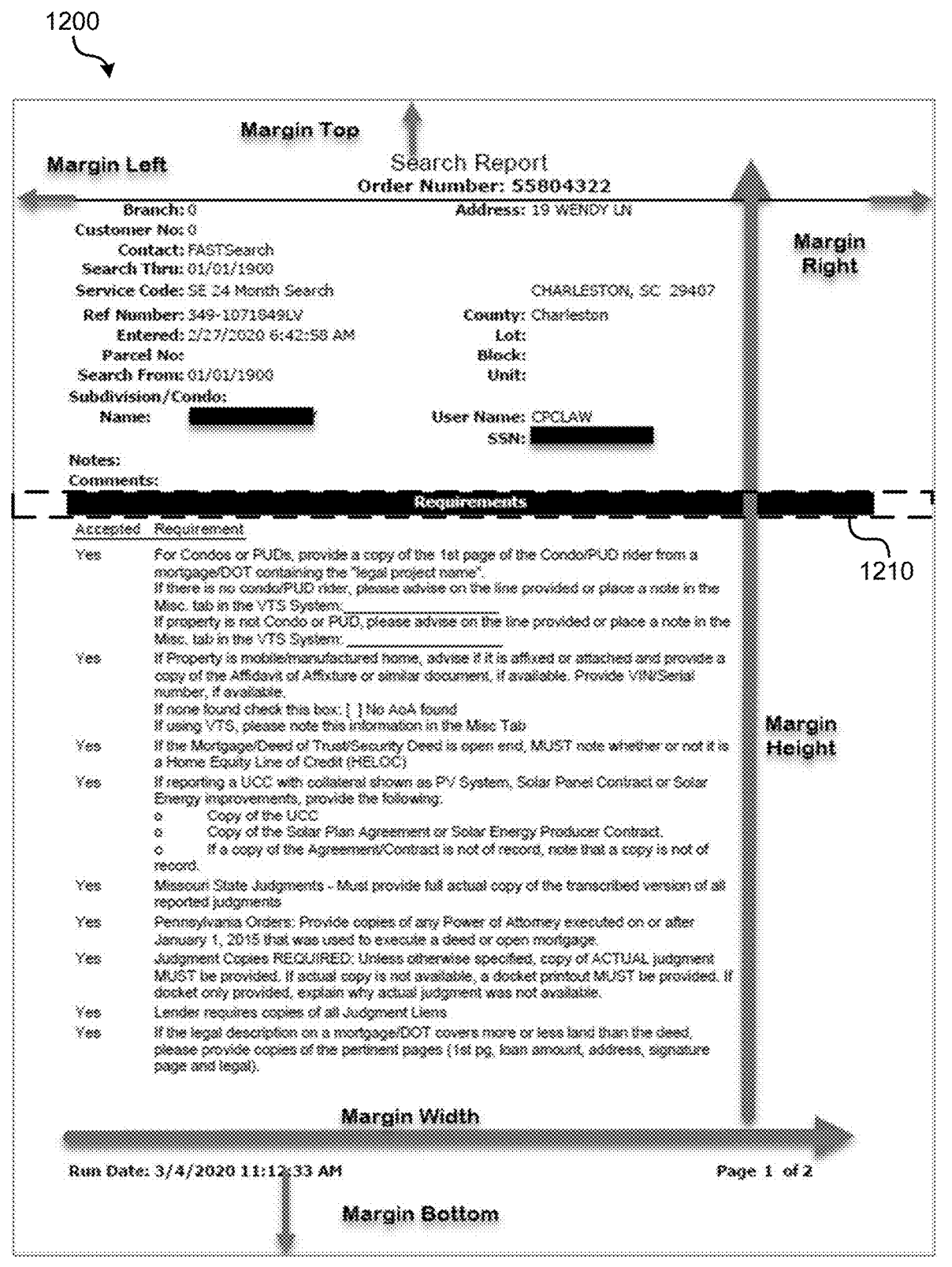

As noted above, in some implementations, image segmentation can be used to classify unstructured document images based on properties of margins contained in the document images. In an image, margins can be denoted by the following six properties: margin left, margin top, margin right, margin bottom and width and height of the margins of the text. FIG. 12 illustrates an example of these six margin properties for a document image. A model can be trained to predict whether a page is start page based on differences between the page's margins and margins of the page that precedes it.

Figure 13:
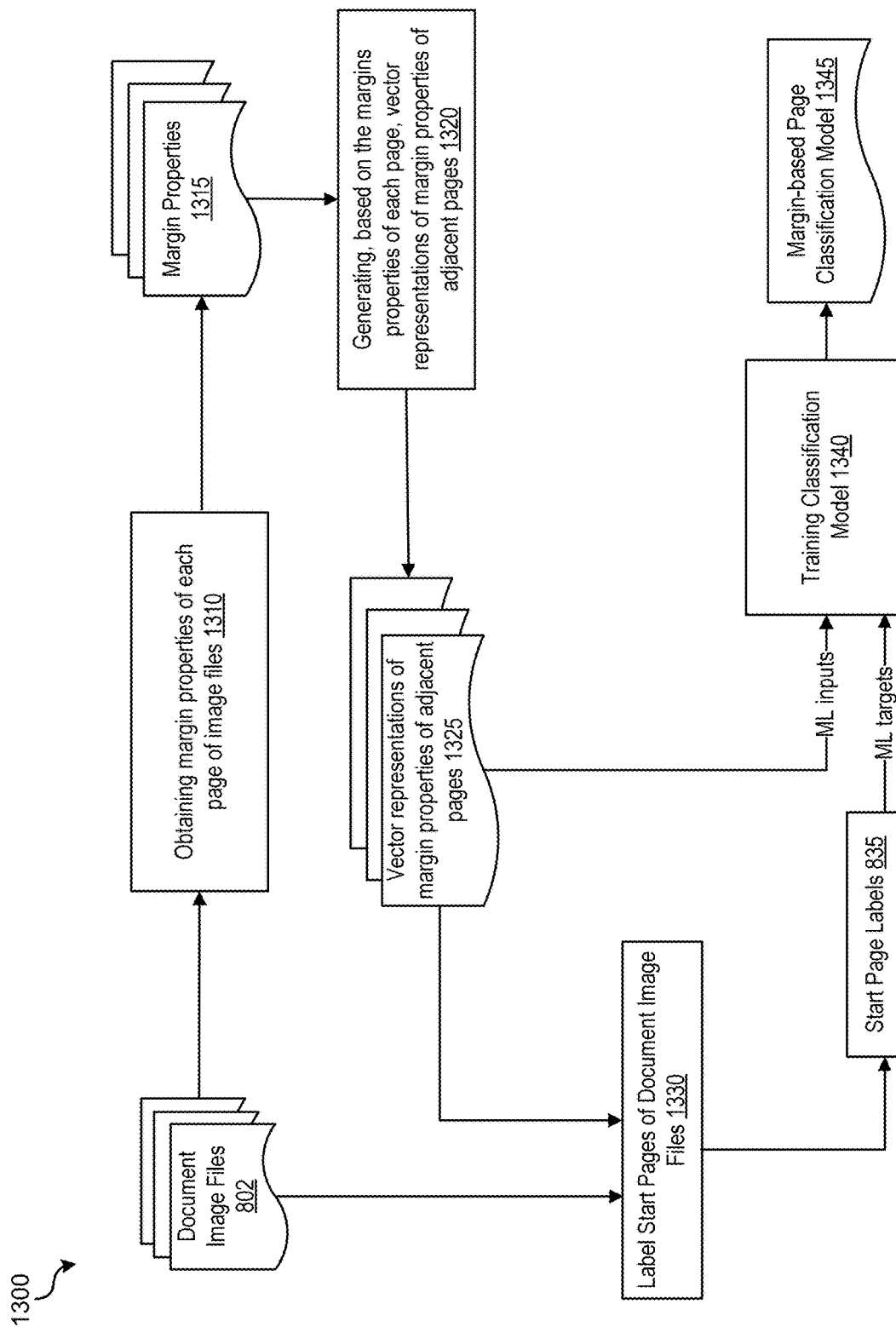
FIG. 13 is an operational flow diagram illustrating an example method of building a model from a dataset of unlabeled document image files to classify document images based on margin properties, in accordance with some implementations of the disclosure.

To this end, FIG. 13 is an operational flow diagram illustrating an example method 1300 of building a model from a dataset of unlabeled document image files 802 to classify document images based on margin properties, in accordance with some implementations of the disclosure.

Figure 14:
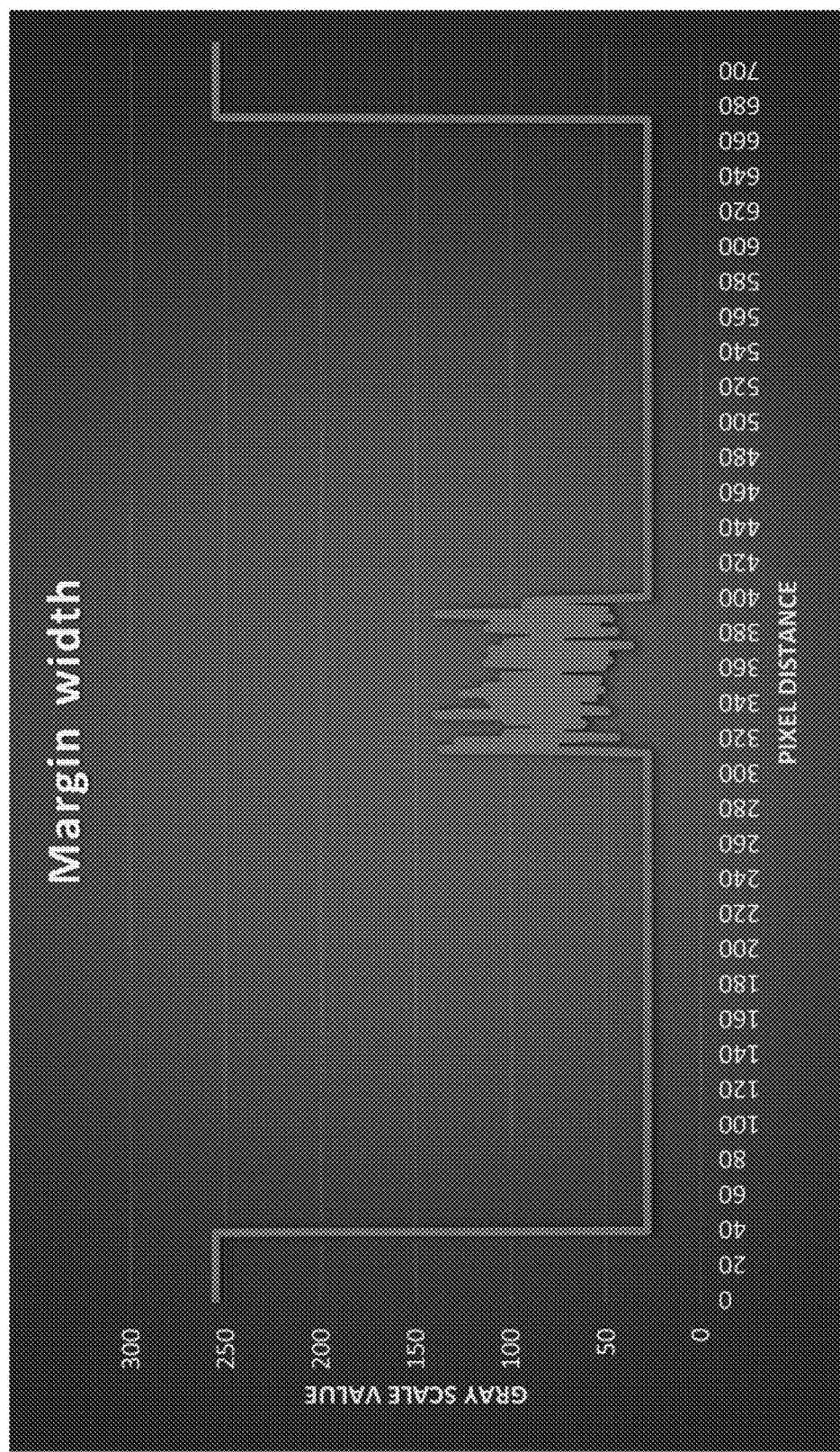
FIG. 14 shows a plot of the pixel gray scale value as a function of pixel distance for a section of a document image.

Operation 1310 includes obtaining margins properties of each page of image files 802. In grayscale images, each pixel can be represented by an integer from 0 (black) to 255 (white). Any margins will typically have an empty space separating them from the document image text. Given these characteristics, margins can be calculated by observing significant changes in pixel density. To illustrate, consider the example document 1200 of FIG. 12, which has a pixel width of 700 pixels and a pixel height of 900 pixels. FIG. 14 shows a plot of the pixel gray scale value as a function of pixel distance for section 1210 (in dashed lines) of the document. As depicted by the plot of FIG. 14, starting from the left, the pixel density drops at pixel 40 and rises again at pixel 673. As such, in this example, the left margin pixel distance can be calculated as 40 and the right margin pixel distance can be calculated as 700−673=27. Following a similar principle of detecting a significant change in pixel intensity for the top and bottom margins, it is observed in this example, starting from the bottom, that pixel density drops around pixel 62 and 858. As such, in this example, bottom margin pixel distance can be calculated as 40 and the top margin pixel distance can be calculated as 900−858=42. The final margin properties in this example are given by:

Margin left=40
Margin right=27
Margin bottom=62
Margin top=42
Margin width=700−(40+27)=633
Margin height=900−(42+62)=796

As the foregoing example illustrates, the margin distances of a document can be computed upon detecting a first large increase in pixel density. One technique that can be utilized to detect this increase is discrete wavelet transformation where the wavelets can be used to highlight areas of sudden change. In other implementations, other techniques for calculation of margins can be utilized.

Operation 1320 includes generating, based on the margins properties of each page, vector representations 1325 of margin properties of adjacent pages. To determine whether a page is a start page of a document, the margins of adjacent pages can be compared to detect significant differences. To illustrate, Table 2 is an example showing the margin properties of the four pages of a four page document, where each margin property is expressed as a pixel distance in the image as described above.

TABLE 2

| Margin Properties | Page 1 - Margin Pixel Distance | Page 2 - Margin Pixel Distance | Page 3 - Margin Pixel Distance | Page 4 - Margin Pixel Distance |
| --- | --- | --- | --- | --- |
| Margin Left | 37 | 37 | 37 | 77 |
| Margin Right | 40 | 40 | 37 | 86 |
| Margin Top | 50 | 41 | 42 | 113 |
| Margin Bottom | 50 | 40 | 42 | 188 |
| Margin Width | 563 | 564 | 563 | 462 |
| Margin Height | 717 | 717 | 729 | 509 |

To formulate model training data in this example, a vector representation of the margin properties of each page and the previous page can be constructed. In one implementation, the vector representation can be formatted to include the margin properties of the current page, followed by the margin properties of the preceding page. For example, for the second page of Table 2, the vector can take the form 37, 40, 41, 40, 564, 717, 37, 40, 50, 50, 563, 717, with the first six entries being the margin properties for page 2 and the next six entries the margin properties for page. For the very first page of a document image package, which has no preceding page, the vector can be initialized such that the vector properties of the non-existent preceding page are all 0. For example, for page 1, the vector can take the form 37, 40, 50, 50, 563, 717, 0, 0, 0, 0, 0, 0.

Operation 1330 includes labeling the start pages of the document image files 802. Labeling can be performed manually, semi-automatically, or automatically. For example, in one implementation, start pages can be labeled by comparing, based on margin pixel differences, using a distance formula, a level of margin similarity between two adjacent pages, and determining whether the level of margin similarity meets a threshold to determine whether the second page is a start page. The results of such a comparison can also be manually reviewed.

Operation 1340 includes training a margin-based classification model 1345 to learn if a page is a start page based on vector representations of the margins of the page and a preceding page. The model 1345 can be a decision tree-based model such as an XGBOOST classifier. For each page 1345, the model can output a confidence score associated with each prediction of whether a page is a start page.

In another implementation, model 1345 can be trained via a pairwise similarity scoring approach. A similarity score can be computed between all pairs of adjacent text regions within each page image by comparing margin feature vectors of each pair of regions using a distance metric such as Euclidean distance. The pairwise similarity scores can be used to predict the probability of a margin change occurring between each pair of adjacent text regions, and a binary classifier such as a neural network can be trained to predict the probability of a margin change based on the pairwise similarity scores between adjacent changes. Thereafter the predicted probabilities can be used to compute the probability of a margin change occurring at each page boundary by aggregating the probabilities of margin changes for all adjacent pairs of text regions that span the page boundary.

In implementations where page margins are instead considered as part of a feature merge method instead of a prediction merge method, the numbers generated to form the vector representation for adjacent pages can instead be utilized and combined with other embeddings from other models to make the final prediction. In one particular implementation, an output layer of a fully convolution network (FCN) can be modified to have a margin branch output with multiple parallel channels corresponding to margin features. For example, the channels can correspond to margin features such as a left margin location, a right margin location, a top margin location, a bottom margin location, a margin width, or a margin height. In this example, the margin branch can output a 6-channel tensor corresponding to these margin features.

As noted above, in some implementations deep learning can be used to predict, based on visual features of an image, a category/class of an image, including whether or not a given image is a start page and/or a document type associated with the image. When it comes to image categorization, there are many visual features that can be considered. However, it is often not feasible to manually identify those features and wrap them into a structured format. In that scenario, a deep learning model such as CNN can be utilized for classification.

Figure 15:
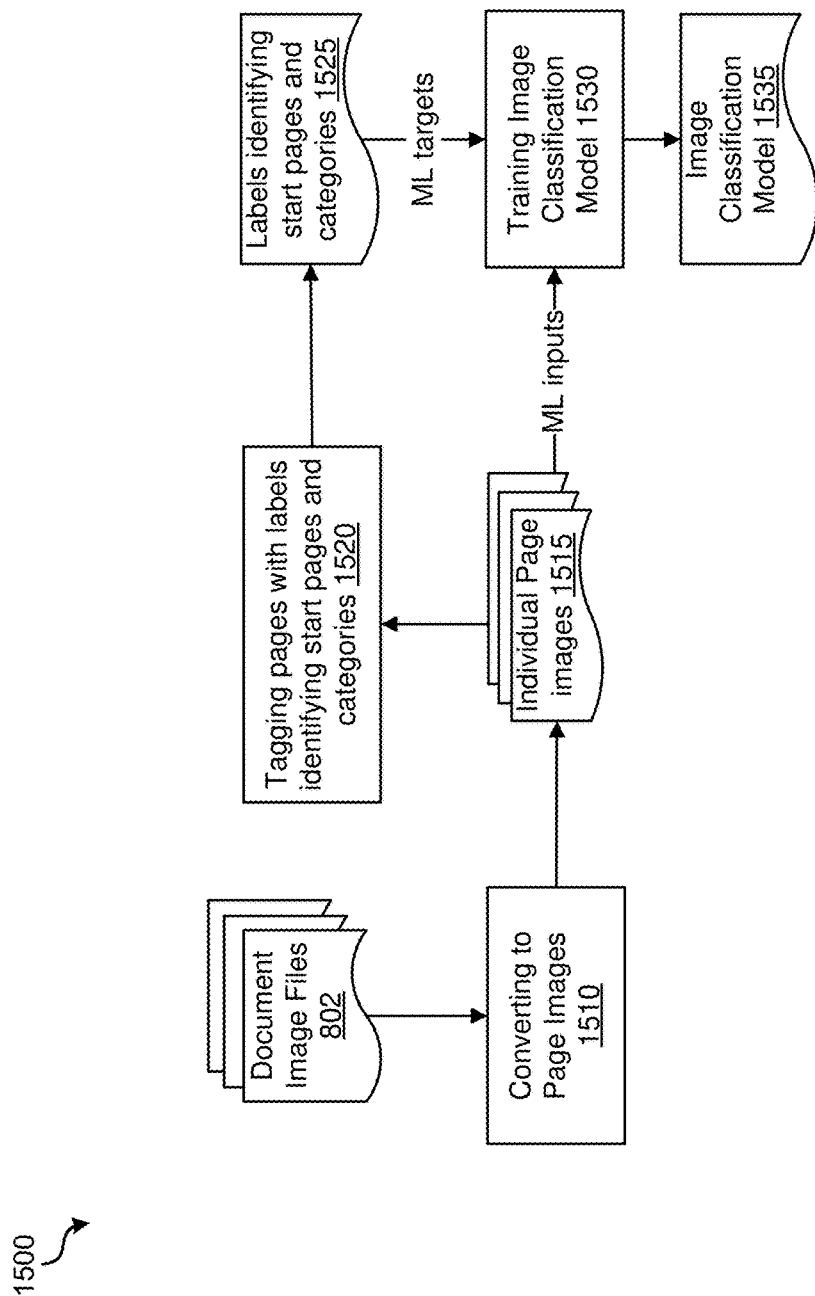
FIG. 15 is an operational flow diagram depicting an example method of building an image classification model that predicts i) whether or not an image corresponds to a start page, and ii) a category of document that the page is associated with, in accordance with some implementations of the disclosure.

To that end, FIG. 15 is an operational flow diagram depicting an example method of building an image classification model 1535 that predicts i) whether or not an image corresponds to a start page, and ii) a category of document that the page is associated with. For the particular examples that follow, the following three categories of documents will be considered: i) maps, ii) search results, and iii) recorded documents. However, it should be appreciated that the described techniques can be generalized to other categories of documents.

Operation 1510 includes converting the document image files 802 to page images 1515. From the document image files 802, image packages (e.g., PDF of images) can be converted into page-wise images of fixed shape and resolution.

Operation 1520 includes tagging the pages with labels 1525 identifying start pages and categories. In some implementations, a GUI can be presented for a user to hand tag (e.g., adding labels such as "recorded documents") page images 1515. During hand tagging, a user may utilize one or more controls or tools for adding labels. Each individual page image can be tagged as belonging to a particular document type and being or not being a first page of a document. To that end, each page can be tagged with binary values identifying whether a page is a start page and a category of a set of categories that the page belongs to. As an example, consider the first page of the document category "search results". This example page can be tagged using the following labels of Table 3, below.

TABLE 3

| Page Training Labels | | | |
| --- | --- | --- | --- |
| Start Page | Maps | Search Results | Recorded Documents |
| 1 | 0 | 1 | 0 |

Operation 1530 includes training an image classification model 1535 based on a training dataset include an input dataset and a target dataset. The input training dataset can include at least some of the individual page images 1515. The target training dataset may include at least some of the labels 1525. In this case, the model 1535 is trained to extract features from an input page image, and output a target prediction of i) whether or not the image corresponds to a start page, and ii) a category of document that the image is associated with. The image classification model 1535 can also output a confidence score associated with each prediction. For example, the model can generate the following four probability scores for a given page:

TABLE 4

| Predictions | | | |
| --- | --- | --- | --- |
| Start Page | Maps | Search Results | Recorded Documents |
| 0.87 | 0.02 | 0.97 | 0.13 |

The image classification model 1535 can be trained as a CNN model such as a ResNet model.

Figure 16:
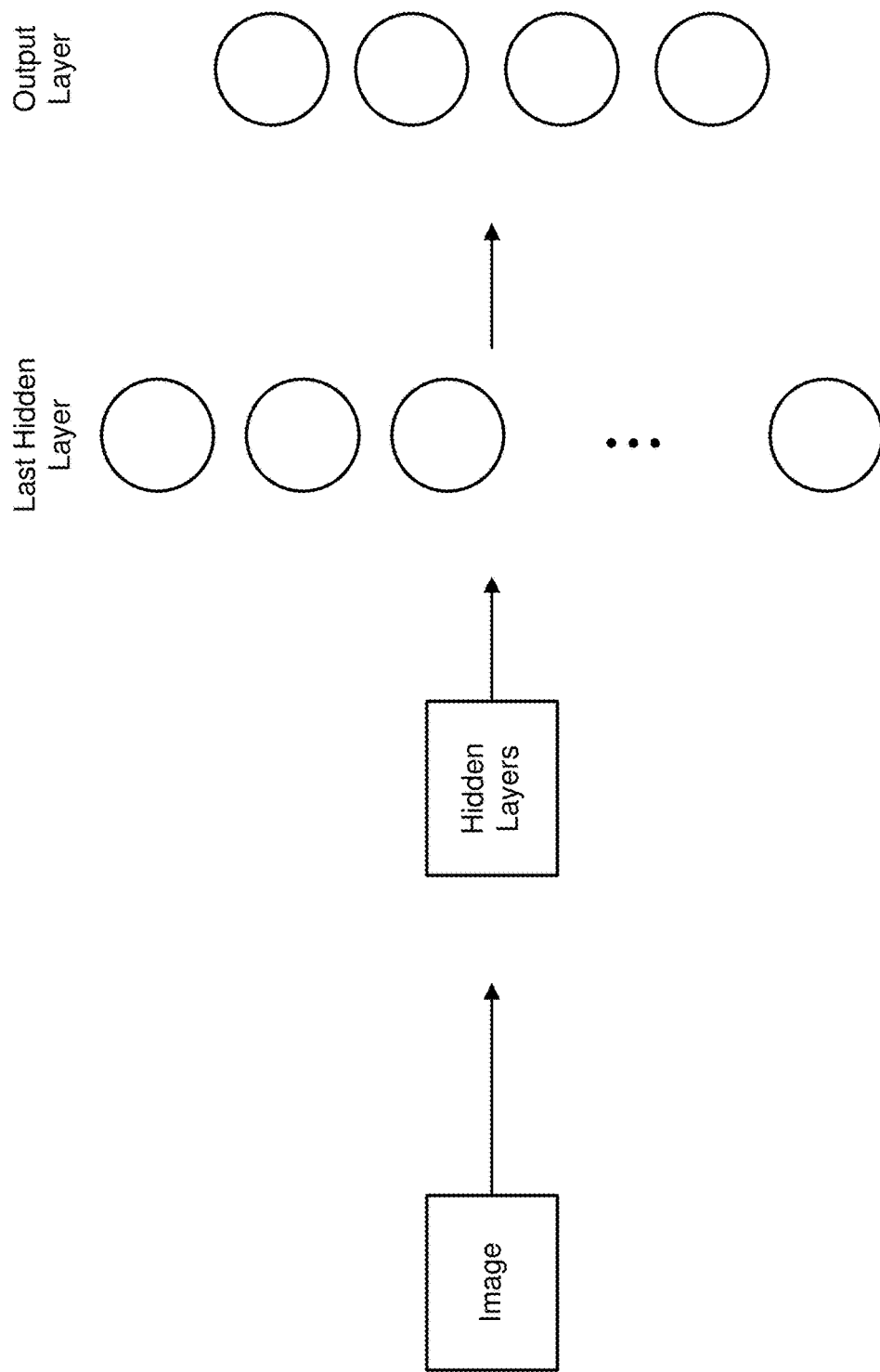
FIG. 16 conceptually illustrates an example of vector output from the last hidden layer of a dependent image classification model that can be used with the method of FIG. 6.

In implementations where image classification is adapted for use with the predictions merge approach, instead of using the predictions of an independent model, a vector output from the last hidden layer of a dependent model can be used as the embeddings described above. This approach is depicted by FIG. 16.

Figure 17B:
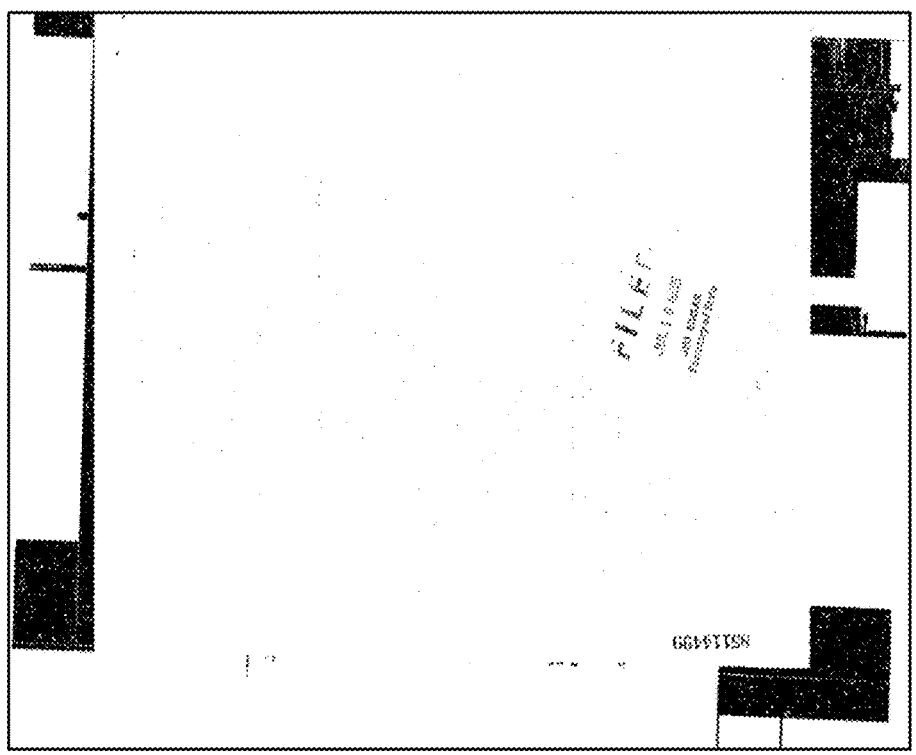
FIG. 17B depicts an example of a "non-blank" image including a vertically arranged recording document number and filing data that is slightly tilted.
Figure 17A:
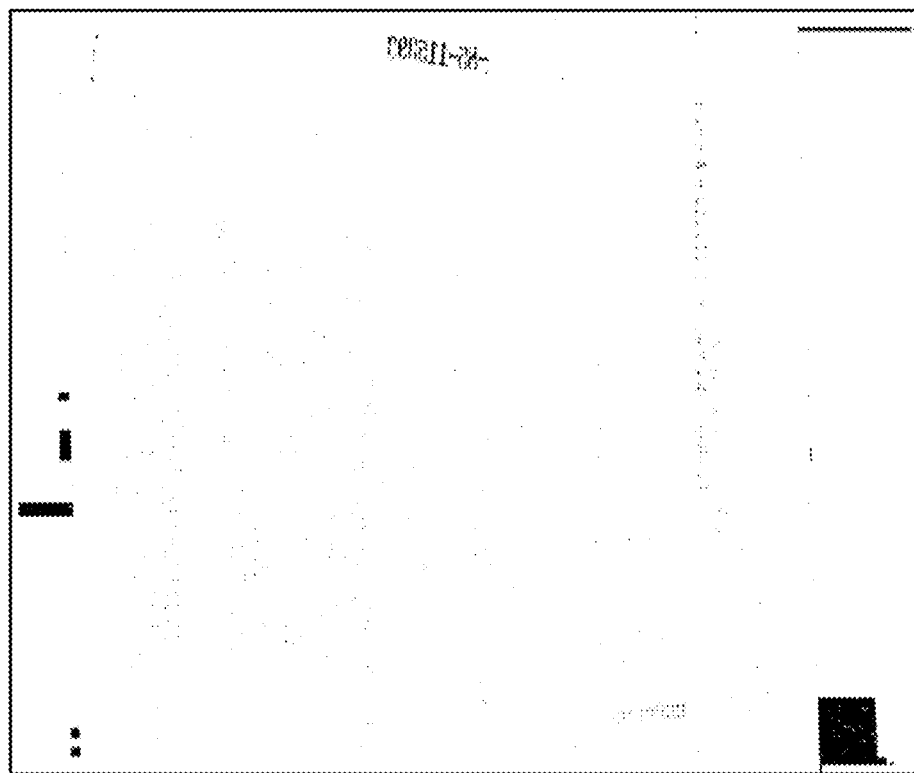
FIG. 17A depicts an example of a "blank" image including a reflection of a recording document number.

In some implementations, an image classification model can be trained to predict whether or not a given page is a "blank" page that does not contain any additional information about a document contained in a document image package. Such information can potentially be useful for identifying blank pages of a document image package such that they can be discarded during document image splitting. For example, it is common in publicly recorded documents that blank pages are present within a document. The blank pages can be considered as separator pages between individual unique documents. In some cases blank pages may also need to be separated from non-blank pages where there is a county or notary seal or a recording document number, but otherwise no other text is present. Such "almost blank" document pages can be prominent in certain counties. For example, FIG. 17A depicts an example of a "blank" image including a reflection of a recording document number. By contrast, FIG. 17B depicts an example of a "non-blank" image including a vertically arranged recording document number and filing data that is slightly tilted.

Figure 18:
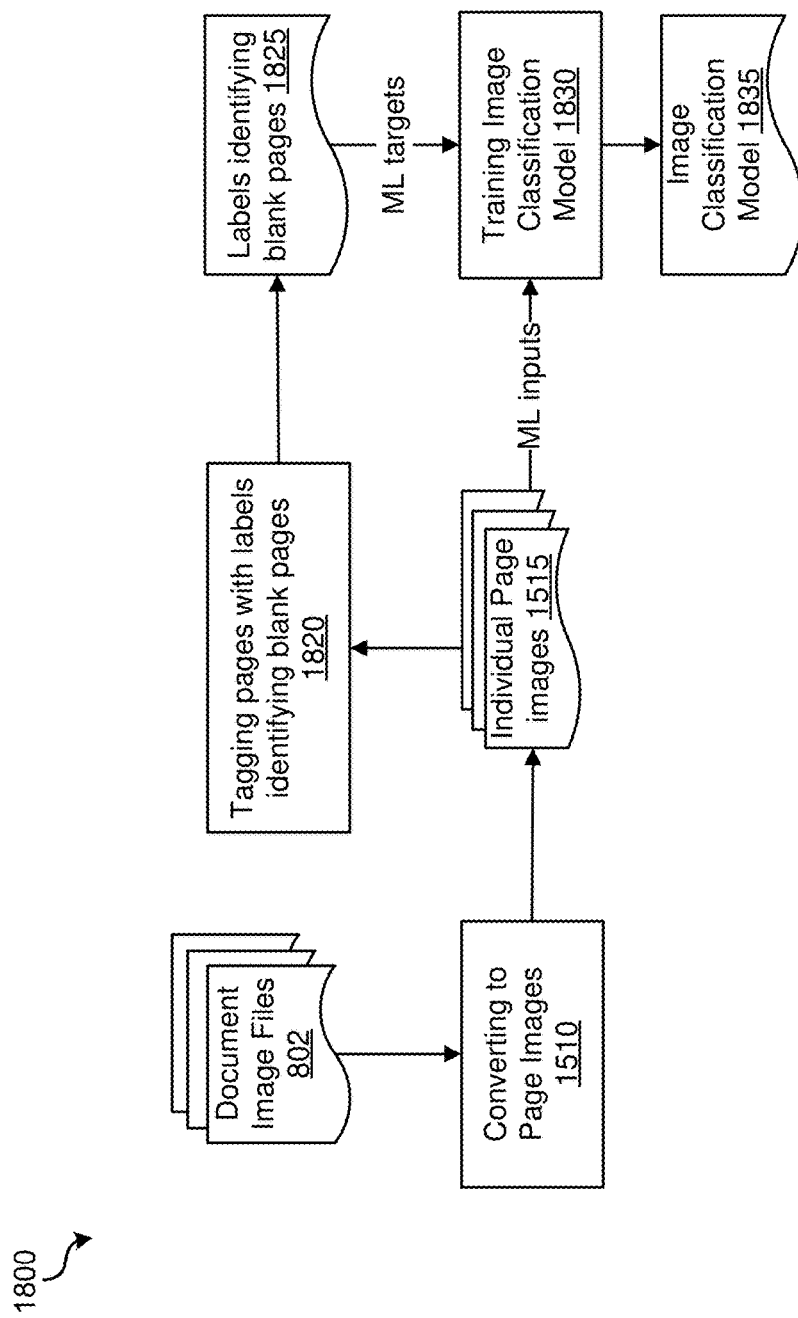
FIG. 18 is an operational flow diagram depicting an example method of building an image classification model that predicts whether or not an image corresponds to a blank page, in accordance with some implementations of the disclosure.

FIG. 18 is an operational flow diagram depicting an example method of building an image classification model 1835 that predicts whether or not an image corresponds to a blank page, in accordance with some implementations of the disclosure. Operation 1510 can be performed as described above with reference to method 1500. Operation 1820 includes tagging pages with labels 1825 identifying blank pages. In some implementations, a GUI can be presented for a user to hand tag (e.g., adding labels such as "blank") page images 1515. During hand tagging, a user may utilize one or more controls or tools for adding labels. Each individual page image can be tagged with a label indicating whether or not it is blank. To that end, each page can be tagged with binary values identifying whether a page is blank. For example, a given page that is not blank, such as the example of FIG. 17C, can be tagged as shown in Table 5, below, where "Valid" refers to a page that is not "Blank".

TABLE 5

| Page Training Labels | |
| --- | --- |
| Blank | Valid |
| 0 | 1 |

Although FIG. 18 contemplates an image classification model 1835 that predicts whether or not an image is blank, it should be noted that the in some implementations the functionality of blank page prediction can be combined with the functionality of start page and page category prediction as described above. As such, in some implementations an image classification model 1835 can be trained to combine the prediction capabilities of model 1535 with blank page prediction. In such cases, during tagging, each page can be tagged with binary values identifying whether a page is a start page, a category of a set of categories that the page belongs to, and whether the page is a blank page. For instance, the preceding example of FIG. 17C can instead be tagged as shown in Table 6, below.

TABLE 6

| Page Training Labels | | | | | |
| --- | --- | --- | --- | --- | --- |
| Start Page | Maps | Search Results | Recorded Documents | Blank | Valid |
| 0 | 0 | 0 | 1 | 0 | 1 |

Operation 1830 includes training an image classification model 1835 based on a training dataset include an input dataset and a target dataset. The input training dataset can include at least some of the individual page images 1515. The target training dataset may include at least some of the labels 1825. In this case, the model 1535 is trained to extract features from an input page image, and output a target prediction of whether the page is a blank page. As discussed above, the model 1835 can also be trained to predict whether or not the image corresponds to a start page, and category of document that the image is associated with. The image classification model 1835 can also output a confidence score associated with each prediction. For example, the model can generate the following six probability scores for a given page:

TABLE 7

| Predictions | | | | | |
| --- | --- | --- | --- | --- | --- |
| Start Page | Maps | Search Results | Recorded Documents | Blank | Valid |
| 0.87 | 0.02 | 0.97 | 0.13 | 0.01 | 0.99 | from which it can be inferred that the page is a start page of probability 0.87 that is valid (not blank) with probability of 0.99 and is a search result with probability of 0.97.

As in the example of model 1535, the image classification model 1835 can be trained as a CNN model such as a ResNet model. In implementations where the CNN model is adapted for use with the predictions merge approach, instead of using the predictions of the model, a vector output from the last hidden layer can be used as the embeddings described above.

As noted above, in some implementations deep learning can be used to predict, based on textual features of an OCR'd image, a category/class of the image, including whether or not a given image is a start page and/or a document type associated with the image.

Figure 19:
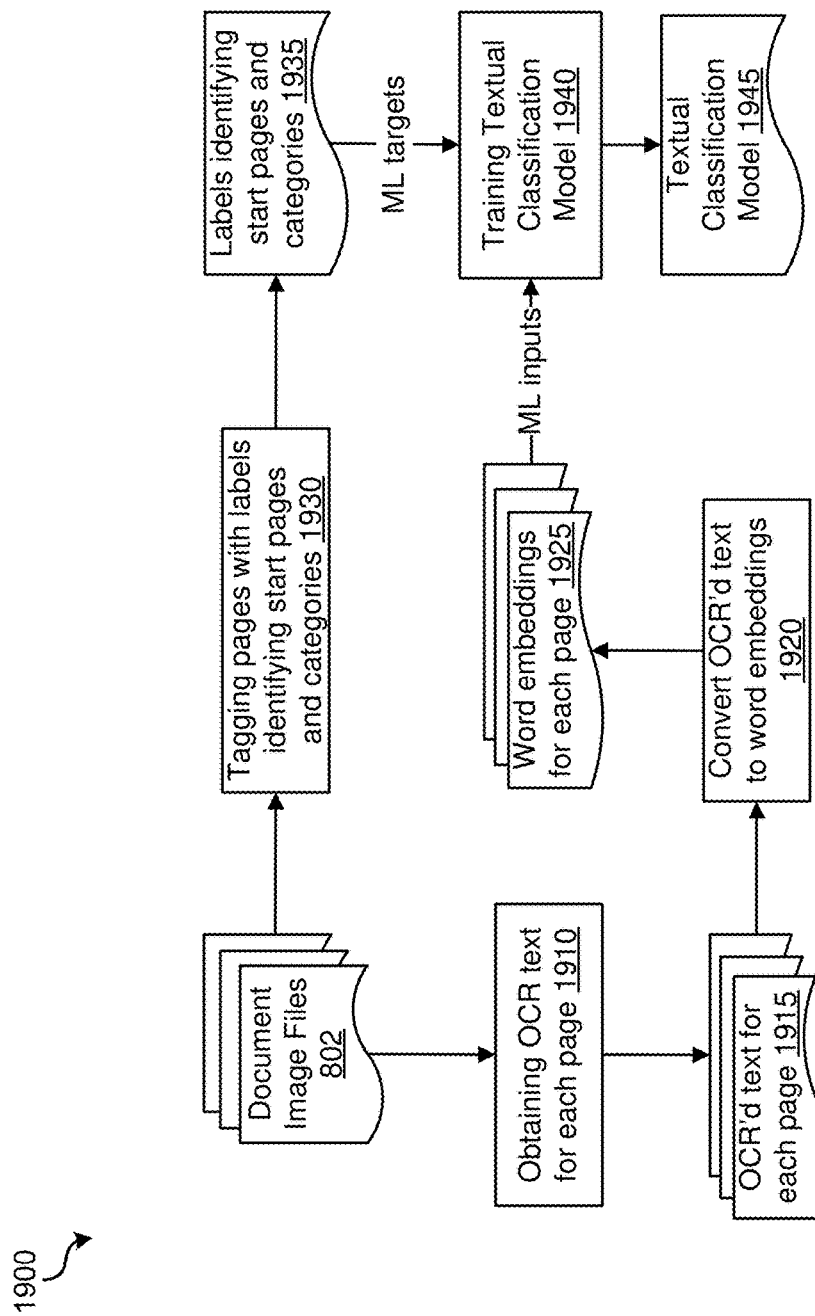
FIG. 19 is an operational flow diagram depicting an example method of building a textual classification model that predicts i) whether OCR'd text of an image corresponds to a start page, and ii) a category of document that the page is associated with, in accordance with some implementations of the disclosure.

To that end, FIG. 19 is an operational flow diagram depicting an example method 1900 of building a textual classification model 1945 that predicts i) whether OCR'd text of an image corresponds to a start page, and ii) a category of document that the page is associated with. For the particular examples that follow, the following three categories of documents will be considered: i) maps, ii) search results, and iii) recorded documents. However, it should be appreciated that the described techniques can be generalized to other categories of documents.

Operation 1910 includes obtaining OCR'd text 1915 for each page of the document image files 802. The OCR'd text 1915 can be in an XML or JSON format. The document image files 802 can be converted to the OCR'd files using any suitable OCR engine.

Operation 1920 includes converting the OCR'd text 1915 to word embeddings 1925 for each page. The generated word embeddings can be in the form of a numerical representation of the words that captures their meaning and relationship with other words. A "token-to-vector" model can be used to generate the word embeddings 1925.

Operation 1930 includes tagging the pages of document image files 1930 with labels 1935 identifying start pages and categories. Operation 1930 can be performed in a manner similar to that described above with reference to operation 1520. For example, the labels of Table 3 can be generated for a given page.

Operation 1940 includes training a textual classification model 1935 based on a training dataset include an input dataset and a target dataset. The input training dataset can include at least some of the word embeddings 1925. The target training dataset may include at least some of the labels 1935. In this case, the model 1935 can be configured to receive word embeddings of OCR'd text of a page image, and output, based on the word embeddings, a target prediction of i) whether or not the page corresponds to a start page, and ii) a category of document that the page is associated with. The textual classification model 1945 can also output a confidence score associated with each prediction. For example, the model can generate probability scores in a manner similar to that described above with reference to Table 4.

The textual classification model 1945 can be trained as a RNN model such as a LSTM model.

Figure 20:
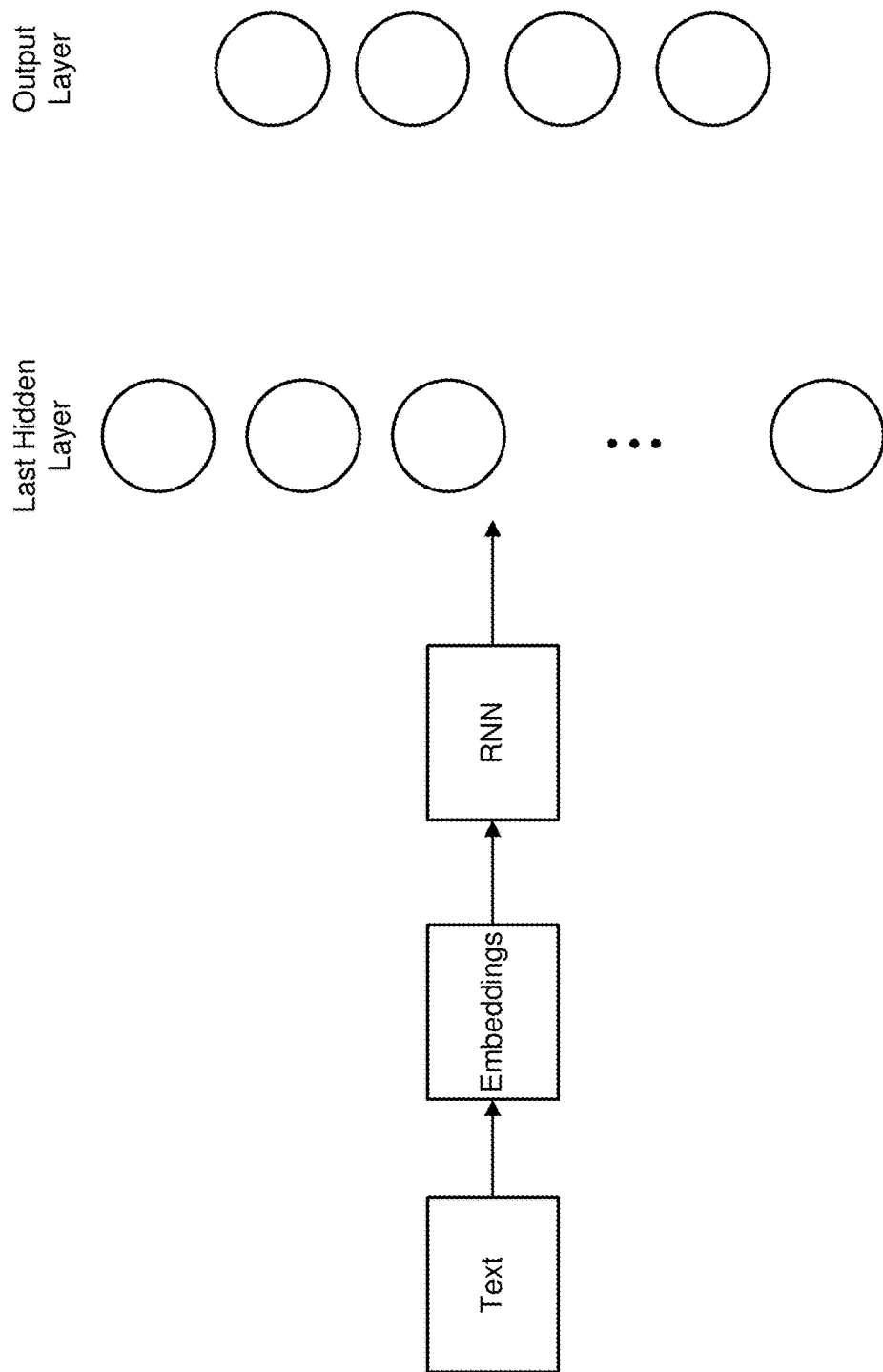
FIG. 20 conceptually illustrates an example of vector output from the last hidden layer of a dependent textual classification model that can be used with the method of FIG. 6.

In implementations where text classification is adapted for use with the predictions merge approach, instead of using the predictions of an independent RNN model, a vector output from the last hidden layer of a dependent model can be used as the embeddings described above. This approach is depicted by FIG. 20.

Figure 21:
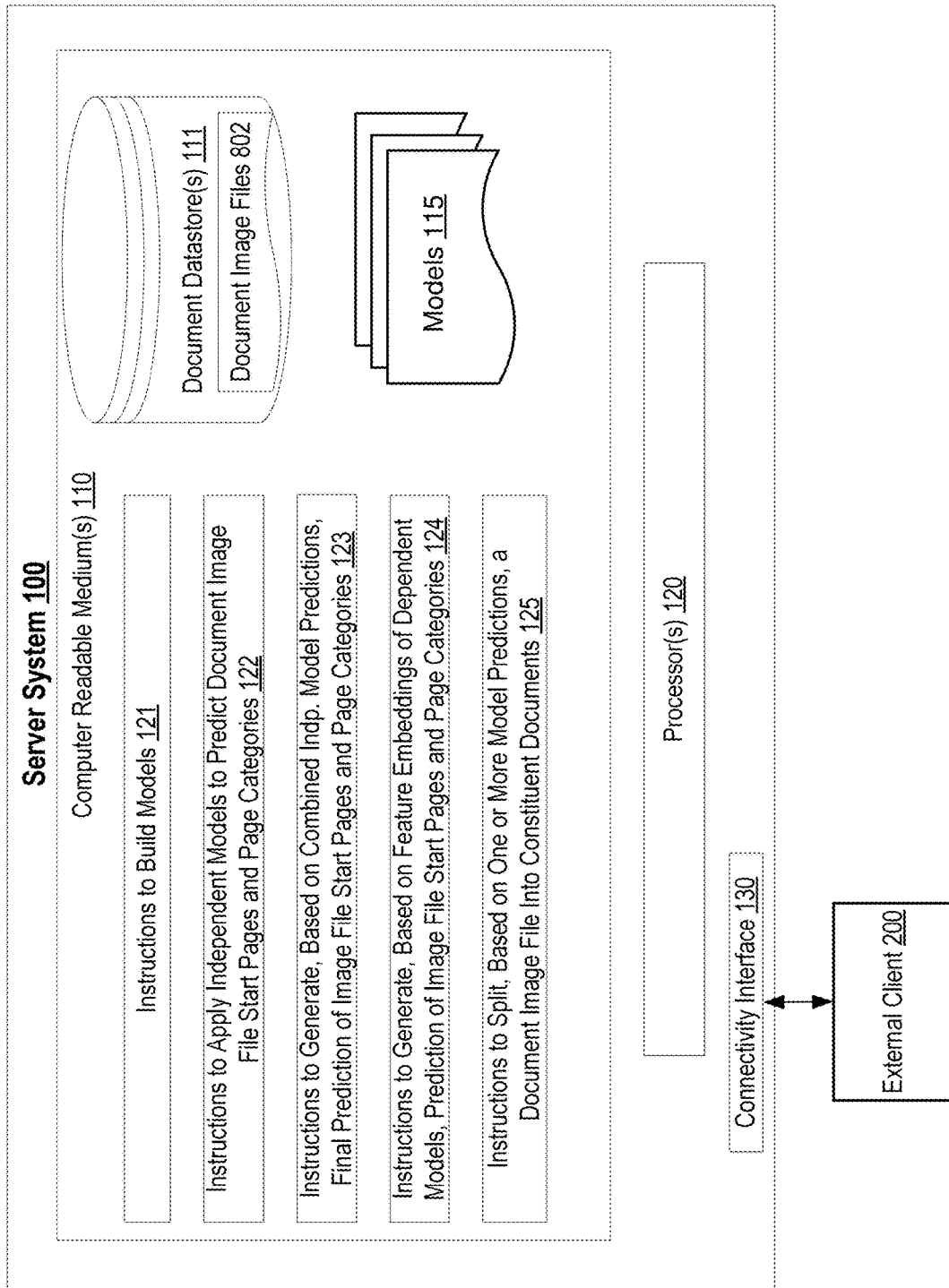
FIG. 21 is a block diagram illustrating a server system, in accordance with some implementations of the disclosure.

FIG. 21 is a block diagram illustrating a server system 100, in accordance with some implementations of the disclosure. The server system 100 comprises at least one computer readable medium 110 upon which are stored instructions that, when executed by a processor 120, cause server system 100 to carry-out implementations of the disclosure. Server system 100 further comprises, at least one processor 120, and a connectivity interface 130. In this example, at least one computer readable medium 110 includes at least one document datastore 111 storing document image files 802, and data associated with one or more trained models 115, which can correspond to any of the models described in the present disclosure (e.g., models 315, models 415, model of FIG. 7, model 845, model 1345, model 1535, model 1835, and/or model 1945). In some implementations, the document datastore 111 can all store documents that have been split from document image files 805 including multiple constituent documents.

The at least one computer readable medium 110 also stores instructions 121 that, when executed by a processor 120, cause server system 100 to build any of the models described herein. For example, execution of instructions 121 may cause server system 100 to perform operations of method 800, method 1300, method 1500, method 1800, method 1900, and/or method 2200. The at least one computer readable medium 110 also stores instructions 122 that, when executed by a processor 120, cause server system 100 to apply independent models to predict document image file start pages and/or page categories. For example, execution of instructions 122 may cause server system 100 to perform operation 310 or operation 2400.

The at least one computer readable medium 110 further stores instructions 123 that, when executed by a processor 120, cause server system 100 to generate, based on a combination of independent model predictions, a final prediction of document image file start pages and page categories. For example, execution of instructions 123 may cause server system 100 to perform operations of method 200 or method 300. The at least one computer readable medium 110 further stores instructions 124 that, when executed by a processor 120, cause server system 100 to generate, based on feature embeddings of dependent models, a prediction of image file start pages and page categories. For example, execution of instructions 124 may cause server system 100 to perform operations of method 200 or method 400.

The at least one computer readable medium 110 further stores instructions 125 that, when executed by a processor 120, cause server system 100 to split, based on one or more model predictions, a document image file into constituent documents. For example, execution of instructions 125 may cause server system 100 to perform operation 250.

Connectivity interface 130 is configured to provide server system 100 with wired and/or wireless communication with external clients 200 via a direct and/or indirect connection over one or more communication networks.

As discussed above, an image classification model 1535 can be trained to predict whether or not an input page image corresponds to a start page. Such a model can be trained using a labeling schema as shown in Table 8, below.

TABLE 8

Labeling scheme for Single Page Image Start Page Prediction

| Page Number | Start Page |
|---|---|
| 1 | 1 |
| 2 | 0 |
| 3 | 1 |
| 4 | 0 |
| 5 | 0 |
| 6 | 0 |
| 7 | 1 |
| 8 | 0 |
| ... | |
| n | 0 |

As depicted, for a given document containing n pages, each page number can be labeled as either corresponding to a start page (e.g., binary label "1"), or not corresponding to a start page (e.g., binary label "0"). Although such a schema can be effective for training a deep learning model to predict start pages that can be used for splitting incoming document packages, in some implementations start page prediction performance can be improved by training a deep learning model to predict start pages based on a concatenated page image input including two or more consecutive page images. For example, a deep learning model can receive an input comprised of a concatenated page comprised of a current page and a prior page as one image, and a prediction can be made as to whether the current page is a start page.

Figure 22:
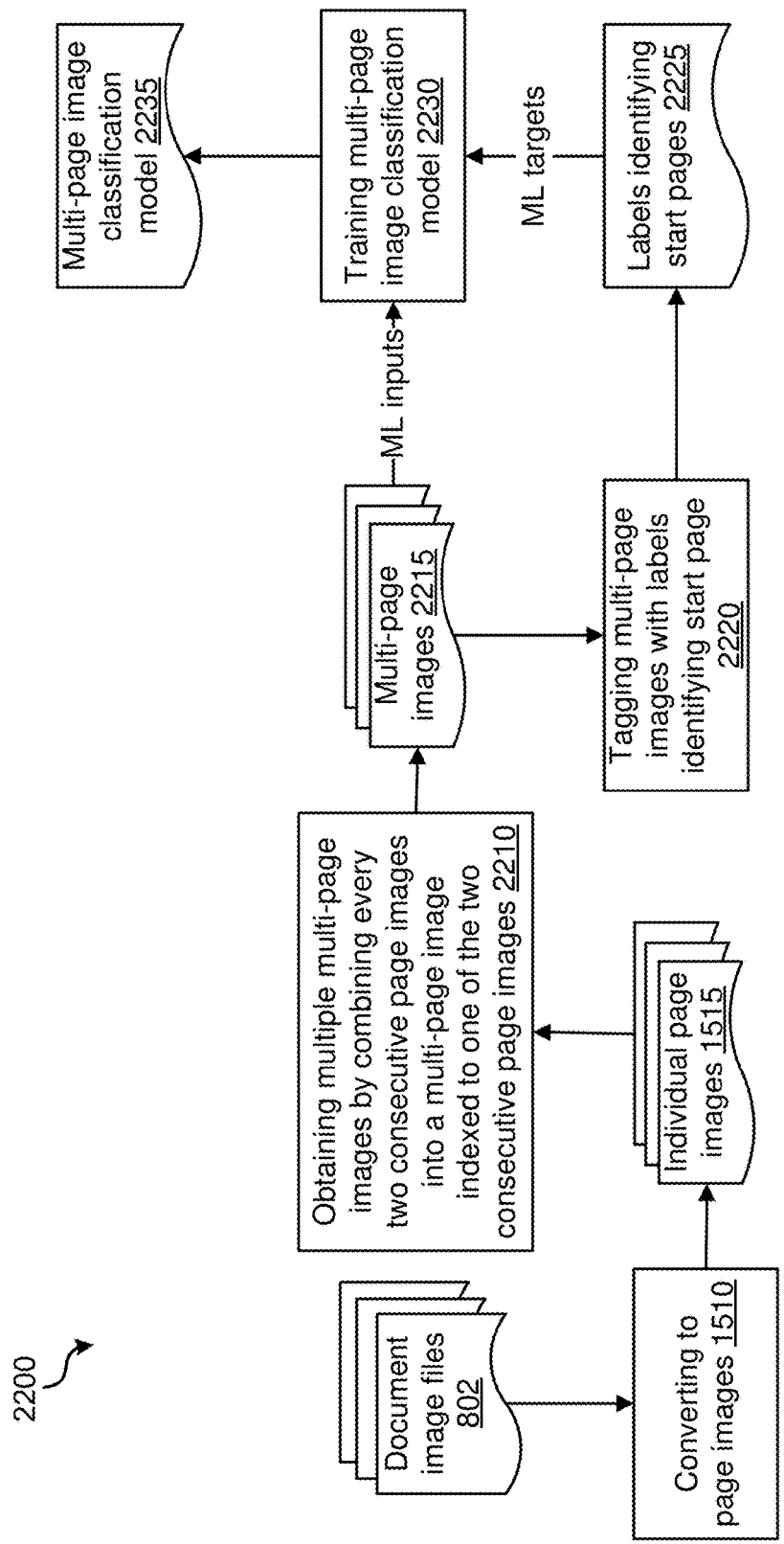
FIG. 22 is an operational flow diagram depicting an example method of building a multi-page image classification model that predicts whether or not a page contained in a multi-page image corresponds to a start page, in accordance with some implementations of the disclosure.

To that end, FIG. 22 is an operational flow diagram depicting an example method 2200 of building a multi-page image classification model 2235 that predicts whether or not a page contained in a multi-page image corresponds to a start page. Operation 1510 includes converting the document image files 802 to page images 1515. From the document image files 802, image packages (e.g., PDF of images) can be converted into page-wise images of fixed shape and resolution.

Figure 23:
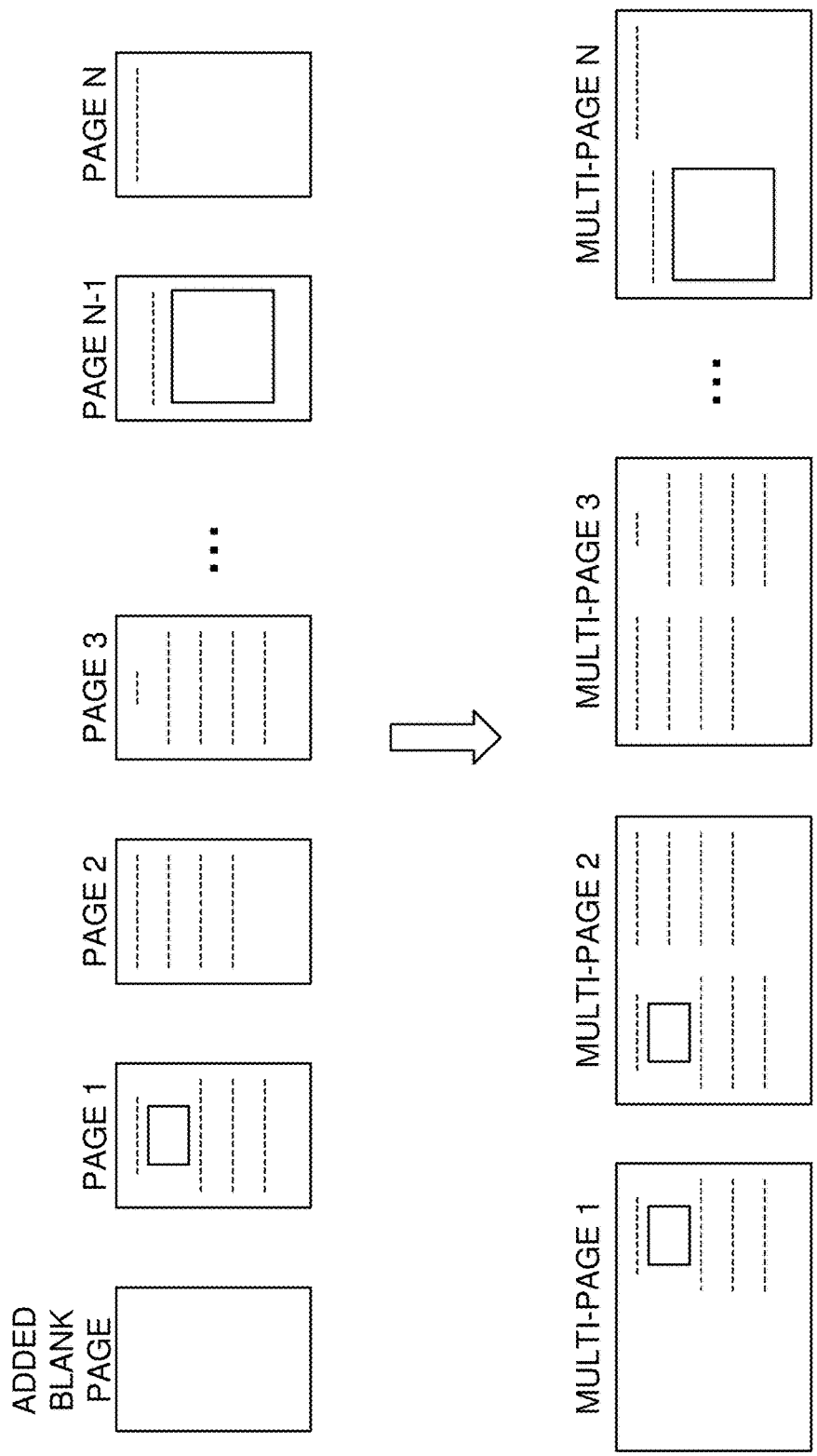
FIG. 23 is a schematic diagram illustrating a process for obtaining multiple multi-page images by combining consecutive page images of an n-page document, in accordance with some implementations of the disclosure.

Operation 2210 include obtaining multiple multi-page images 2215 by combining every two consecutive page images 1515 into a multi-page image 2215 indexed to one of the two consecutive page images 1515. FIG. 23 is a schematic diagram illustrating this process for an n-page document. As depicted in this example, page 1 can be combined with page 2 to form multi-page image 2 indexed to page 2, page 2 can be combined with page 3 to form multi-page image 3 indexed to page 3, and so forth until page n−1 is combined with page n to form multi-page image n indexed to page n. In addition, in the foregoing example a blank page is combined with page 1 to form multi-page image 1 indexed to page 1. As such, by adding a blank "page 0" that precedes page 1, a number of multi-page images 2215 is the same as a number of page images 1515, and each multi-page image can be indexed to a given page image. In an alternative implementation, rather than combine a blank page with the first page, the last page n could instead be combined with a blank page (e.g., blank page "n+1"). In such implementations, indexing could be such that multi-page image 1 corresponds to the combination of page 1 and page 2, and multi-page image n corresponds to the combination of page n and blank page n+1.

In the example of FIG. 23, consecutive pages are concatenated into an image such that the pages are horizontally adjacent to one another in ascending order. However, it should be appreciated that other forms of concatenation can be implemented to form multi-page images 2215. For example, consecutive pages could be concatenated into an image such that: the pages are vertically adjacent to one another in ascending order, are vertically adjacent to one another in descending order, are horizontally adjacent to one another in descending order, or in some other fashion. Moreover, in some implementations consecutive pages could be combined into a multi-page image such that there is a partial overlap between the pages.

Operation 2220 includes tagging the multi-page images 2215 with labels 2225 identifying start pages. To this end, Table 9, below, illustrates an example labeling schema that can be used for the same document as in the example of Table 8.

TABLE 9

Labeling schema for Multi-Page Image Start Page Prediction

| Indexed Page | Multi-Page Image Content | Start Page |
|---|---|---|
| 1 | Page 0 \| Page 1 | 1 |
| 2 | Page 1 \| Page 2 | 0 |
| 3 | Page 2 \| Page 3 | 1 |
| 4 | Page 3 \| Page 4 | 0 |
| 5 | Page 4 \| Page 5 | 0 |
| 6 | Page 5 \| Page 6 | 0 |
| 7 | Page 6 \| Page 7 | 1 |
| 8 | Page 7 \| Page 8 | 0 |
| ... | | |
| n | Page n −1 \| Page n | 0 |

As depicted in this example, page 0 is a blank page added before page 1. In addition, concatenated page 1 can be assumed to be a start page. In the depicted example, a multi-page image is labeled as corresponding to a start page (e.g., using the binary label "1") when the right side page corresponds to a start page. This determination can be made by comparing the right side (page) of the image with the left side (page) and determining that they correspond to different documents. As discussed above, in other implementations a blank page could instead be added after the last page n, and indexed page 1 could instead correspond to a multi-page image containing pages 1 and 2. In addition, in other implementations multi-page images could be labeled as corresponding to a start page when the left side page image corresponds to a start page. More generally, multi-page images could be labeled as corresponding to a start page when the two page images contained therein correspond to two different documents.

In some implementations, a GUI can be presented for a user to hand tag (e.g., adding labels such as "1" or "0") multi-page images 2215. During hand tagging, a user may utilize one or more controls or tools for adding labels. Each individual multi-page image 2215 can be tagged as being or not being associated with a first page of a document. The GUI can also indicate what individual page a multi-page image is indexed to.

Operation 2230 includes training a multi-page image classification model 2235 based on a training dataset include an input dataset and a target dataset. The input training dataset can include at least some of the multi-page images 2215. The target training dataset may include at least some of the labels 2225. In this case, the model 2235 is trained to extract features from an input multi-page image, and output a target prediction of whether or not the multi-page image corresponds to a start page. For example, the target prediction can indicate whether a right side of the multi-page image, or some other section of the multi-page image corresponding to the current page being evaluated, is a start page. The target prediction can be based on ingested image features indicating differences between two sections of the multi-page image that are indicative of two different documents. The multi-page image classification model 2235 can also output a confidence score associated with each prediction. For example, the model can generate a probability score between 0 and 1.

The multi-page image classification model 2235 can be trained using a deep learning model such as a neural network. Any suitable neural network model such as a CNN model (e.g., a ResNet model) can be used to train the model 2235.

It was observed that by virtue of implementing the foregoing multi-page image classification technique for predicting start pages, a deep learning model could be trained predict a start page with higher accuracy as contrasted with deep learning approaches that predicted start pages using only single page images as an input. As such, the foregoing technique could be used to improve document image package splitting performance.

In some implementations, the multi-page image classification model 2235 can be used to independently predict what pages of a given document file correspond to a start page. In some implementations, the multi-page image classification model 2235 can be used in combination with other models described above (e.g., object detection model 845, margin-based page classification model 1345, image classification model 1535, image classification model 1835, and/or textual classification model 1945) to generate a multi-modal ensemble prediction with improved performance. For example, multi-page image classification model 2235 could be incorporated into method 300 as one of the independent models 316 from which prediction outputs are ensembled. In other implementations, the foregoing multi-page image classification approach could be adapted for use with the predictions merge approach, where instead of using the predictions of an independent model, a vector output from the last hidden layer of a dependent model can be used as the embeddings described above.

In some implementations, the multi-page image classification model 2235 can be trained to make a start page prediction for a current page based on an input multi-page image including a combination of more than two consecutive page images, including the current page. For example, each multi-page image could be formed by combining three consecutive page images (e.g., the current page, a page before the current page, and a page after the current page), or even more than three consecutive page images. In such implementations, each multi-page image can be indexed to one of the three or more consecutive pages. In such instances, more than one blank page image could be added to page images 1515 (e.g., a blank page before the first page, and a blank page after the last page) to generate a dataset of which a number of multi-page images is the same as the number of page images.

FIG. 24 is an operational flow diagram illustrating an example method 2400 of splitting a document image file containing multiple documents into multiple documents using a multi-page image classification model (e.g., model 2235), in accordance with some implementations of the disclosure. FIG. 24 will be described with reference to FIG. 25, which is a schematic diagram illustrating one particular embodiment of method 2400 where a document image file 2500 is split.

Operation 2410 includes obtaining a document image file (e.g., document image file 2500) including multiple pages and documents. For example, a document image file 2500 can be obtained. The document image file can include can correspond to a dataset of an unstructured document image package as described above with reference to image file 205.

Operation 2420 includes obtaining first multiple page images corresponding to the multiple pages. For example, a document image file 2500 (e.g., PDF of document images) can be converted into individual page images 2501.

Operation 2430 includes adding a blank page image to the first multiple page images to obtain second multiple page images. For example, blank page image 2502 can be added to page images 2501 to obtain updated page images 2503. In this example, blank page image 2502 is illustrated as being ordered before the first page of page images 2501. Alternatively, blank page image 2502 can be ordered after the last page of page images 2501.

Figure 25:
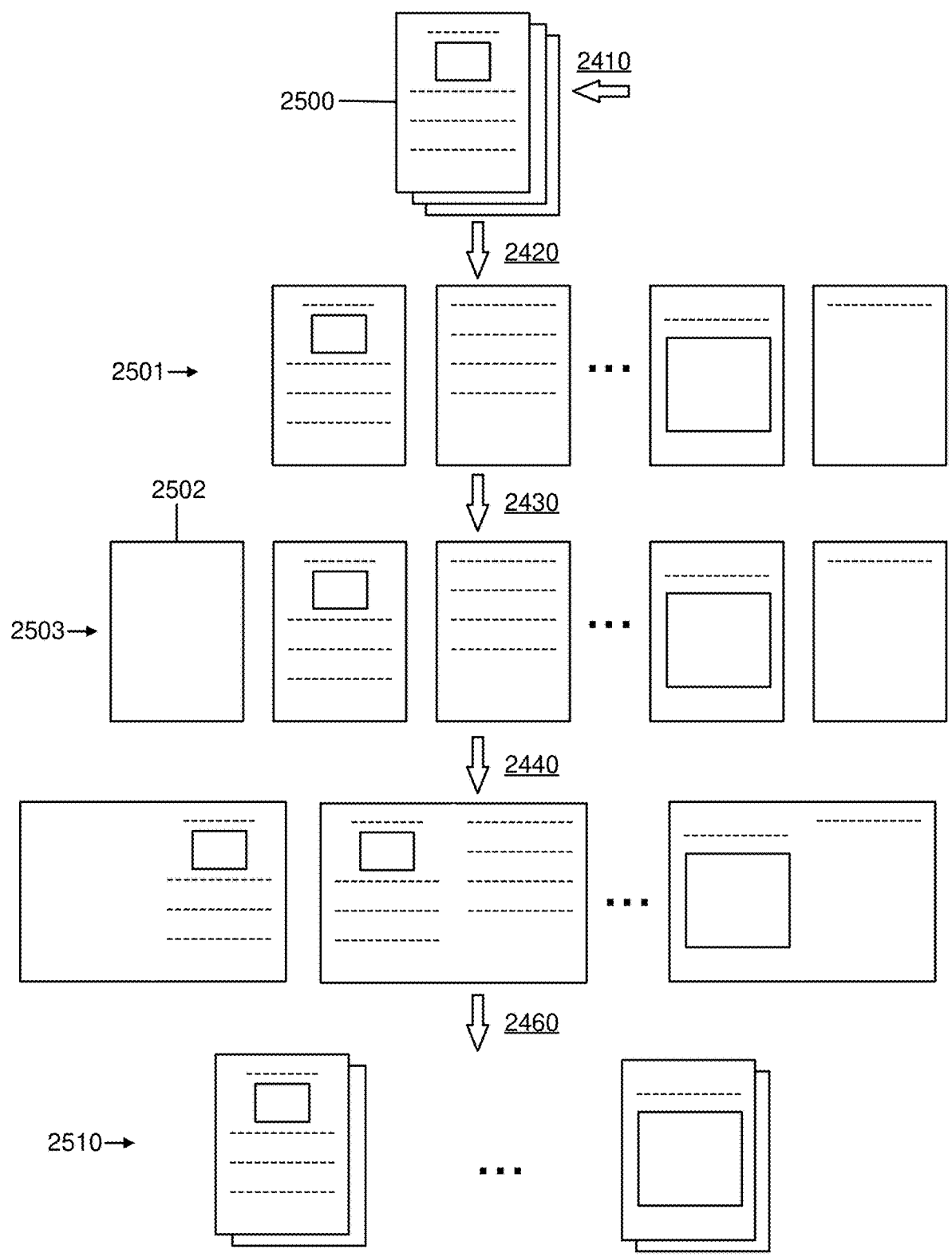
FIG. 25 is a schematic diagram illustrating one particular embodiment of the method of FIG. 24.

Operation 2440 includes obtaining multiple multi-page images by combining every two consecutive page images of the second multiple page images into a multi-page image associated with a page of the multiple pages. Consecutive pages can be concatenated into an image such that the consecutive pages are horizontally adjacent to one another in ascending order or descending order, or vertically adjacent to one another in ascending order or descending order. For example, multiple multi-page images as depicted in FIG. 25 can be obtained by concatenating every two consecutive page images of updated page images 2503 such that consecutive pages are horizontally adjacent to one another in ascending order. In the example of FIG. 25, each of the multi-page images can be associated with a page corresponding to a right side of the image. In some implementations consecutive pages could be combined into a multi-page image such that there is a partial overlap between the pages.

Operation 2450 includes generating, for each page of the multiple pages, based at least on the multi-page image associated with the page, using a trained multi-page image classification model, a prediction output indicating whether or not the page is a first page of a document. The trained multi-page image classification model can be configured to extract features from an input multi-page image, and output a prediction indicating whether or not the multi-page image corresponds to a start page. The output prediction can include a confidence score.

Operation 2460 includes splitting, based on the prediction generated for each page, the document image file into multiple documents. Splitting can be performed by separating, based on pages classified as first/start pages, adjoining document images in the document image file. For example multiple documents 2510 can be obtained by splitting document image file 2500 based on the predicted first/start pages contained in document image file 2500.

In other implementations, the output of operation 2450 can be incorporated into a multi-modal ensemble prediction method as described above, and operation 2460 can be skipped.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer-readable medium having executable instructions stored thereon that, when executed by a processor, cause the processor to perform operations comprising:
   obtaining a document image file including multiple pages corresponding to multiple documents;
   generating, for each page of the multiple pages, using multiple independent trained models, multiple independent predictions, each of the multiple independent predictions indicating whether or not the page is a first page of one of the documents;
   generating, for each page of the multiple pages, based on the multiple independent predictions, using an additional trained model, a final prediction output indicating whether or not the page is the first page of one of the documents,
   wherein the multiple independent trained models comprise two or more models selected from the group consisting of:
      a first trained model configured to predict, for each page, based on first image features of a multi-page image associated with the page, whether or not the page is the first page of one of the documents;
      a second trained model configured to predict, for each page, based on second image features of the page, whether or not the page is the first page of one of the documents;
      a third trained model configured to predict, for each page, based on font feature changes between the page and an adjacent page, whether or not the page is the first page of one of the documents;
      a fourth trained model configured to predict, for each page, based on margin feature changes between the page and the adjacent page, whether or not the page is the first page of one of the documents; and
      a fifth trained model configured to predict, for each page, based on textual features obtained by performing optical character recognition on the page, whether or not the page is the first page of one of the documents.

2. The non-transitory computer-readable medium of claim 1, wherein the multiple independent trained models comprise the first trained model.

3. The non-transitory computer-readable medium of claim 2, wherein the operations further comprise obtaining multiple multi-page images by combining every two consecutive pages of the multiple pages, the multiple multi-page images including the multi-page image associated with each page.

4. The non-transitory computer-readable medium of claim 3, wherein obtaining the multiple multi-page images further comprises: forming one of the multi-page images by combining a blank page with one of the multiple pages.

5. The non-transitory computer-readable medium of claim 3, wherein combining every two consecutive pages of the multiple pages comprises concatenating every two consecutive pages of the multiple pages.

6. The non-transitory computer-readable medium of claim 1, wherein the operations further comprise generating the first trained model by:
   obtaining multiple page images associated with multiple document image files;
   obtaining multiple multi-page images by combining every two consecutive page images of the multiple page images;
   tagging the multiple multi-page images with multiple labels, each of the labels indicating whether a respective one of multi-page images corresponds to a first page; and
   training, based on the multiple multi-page images and the multiple labels, an image classification model as the first trained model.

7. The non-transitory computer-readable medium of claim 3, wherein:
   generating the first trained model further comprises: adding a blank page image to the multiple page images; and
   obtaining the multiple multi-page images comprises combining the blank page image with one of the multiple page images to form one of the multi-page images.

8. The non-transitory computer-readable medium of claim 2, wherein the multiple independent trained models comprise the third trained model.

9. The non-transitory computer-readable medium of claim 2, wherein the multiple independent trained models comprise the fourth trained model.

10. The non-transitory computer-readable medium of claim 1, wherein the multiple documents are associated with a real property, the multiple documents comprising: a map, a search result, or a recorded document.

11. The non-transitory computer-readable medium of claim 1, wherein the operations further comprise: splitting, based on the final prediction output generated for each page, the document image file into the multiple documents.

12. A non-transitory computer-readable medium having executable instructions stored thereon that, when executed by a processor, cause the processor to perform operations comprising:
   obtaining a document image file including multiple pages corresponding to multiple documents;
   obtaining, for each page of the multiple pages, using multiple dependent models of a neural network, multiple feature embeddings, each of the feature embeddings corresponding to at least features of the page that are indicative of whether or not the page is a first page of one of the documents;
   combining, for each page of the multiple pages, the feature embeddings into combined feature embeddings; and
   generating, for each page of the multiple pages, based on the combined feature embeddings, using a neural network, a prediction output indicating whether or not the page is the first page of one of the documents,
   wherein the multiple feature embeddings of each comprise two or more feature embeddings selected from the group consisting of:
      first image features of a multi-page image including a combination of the page and an adjacent page;
      second image features of the page;
      textual features of the page;
      font features of the page and the adjacent page; and
      margin features of the page and the adjacent page,
   wherein a first feature embedding of the multiple feature embeddings comprises the first image features, and wherein the operations further comprise obtaining the first image features of each page by concatenating the page with the adjacent page to form the multi-page image.

13. The non-transitory computer-readable medium of claim 12, wherein a second feature embedding of the multiple feature embeddings comprises an output of a last hidden layer of one of the multiple dependent models.

14. The non-transitory computer-readable medium of claim 12, wherein a second feature embedding of the multiple feature embeddings comprises the font features of the page and the adjacent page.

15. The non-transitory computer-readable medium of claim 12, wherein a second feature embedding of the multiple feature embeddings comprises the margin features of the page and the adjacent page.

16. A non-transitory computer-readable medium having executable instructions stored thereon that, when executed by a processor, cause the processor to perform operations comprising:
   obtaining a document image file including multiple pages corresponding to multiple documents;
   obtaining first multiple page images corresponding to the multiple pages;
   adding a blank page image to the first multiple page images to obtain second multiple page images;
   obtaining multiple multi-page images by combining every two consecutive page images of the second multiple page images into a multi-page image associated with a page of the multiple pages; and
   generating, for each page of the multiple pages, based at least on the multi-page image associated with the page, using a trained image classification model, a first prediction indicating whether or not the page is a first page of one of the documents.

17. The non-transitory computer-readable medium of claim 16, wherein the operations further comprise: splitting, based on the first prediction generated for each page, the document image file into the multiple documents.

18. The non-transitory computer-readable medium of claim 16, wherein the operations further comprise:
   generating, for each page of the multiple pages, using a second trained model, a second prediction indicating whether or not the page is the first page of one of the documents; and
   generating, for each page of the multiple pages, based at least on the first prediction and the second prediction, using a third trained model, a final prediction output indicating whether or not the page is the first page of one of the documents.

* * * * *